United States Patent
Saito et al.

(10) Patent No.: US 12,422,090 B2
(45) Date of Patent: Sep. 23, 2025

(54) FIXING DEVICE AND FIXING STRUCTURE FOR ARTICLE ATTACHING MEMBER

(71) Applicant: DANDORI VIS CO., LTD., Tokyo (JP)

(72) Inventors: Kenji Saito, Tokyo (JP); Kyohei Kaneda, Tokyo (JP)

(73) Assignee: DANDORI VIS CO., LTD., Tokyo (JP)

( * ) Notice: Subject to any disclaimer, the term of this patent is extended or adjusted under 35 U.S.C. 154(b) by 0 days.

(21) Appl. No.: 18/575,471

(22) PCT Filed: Dec. 22, 2022

(86) PCT No.: PCT/JP2022/047414
§ 371 (c)(1),
(2) Date: Dec. 29, 2023

(87) PCT Pub. No.: WO2024/024126
PCT Pub. Date: Feb. 1, 2024

(65) Prior Publication Data
US 2025/0075848 A1    Mar. 6, 2025

(30) Foreign Application Priority Data
Jul. 25, 2022   (JP) .................................. 2022-118321

(51) Int. Cl.
A47G 1/22     (2006.01)
F16B 5/02     (2006.01)
F16M 13/02    (2006.01)

(52) U.S. Cl.
CPC ............... *F16M 13/02* (2013.01); *F16B 5/02* (2013.01); *F16M 2200/08* (2013.01)

(58) Field of Classification Search
CPC ........... A47G 1/22; A47G 1/1633; F16B 5/02; F16B 15/0053
See application file for complete search history.

(56) References Cited

U.S. PATENT DOCUMENTS 4,795,294 A * 1/1989 Takada .................... A47G 1/22
                                                    248/547
5,346,169 A * 9/1994 Polonsky ................ A47G 1/20
                                                    248/225.11
(Continued)

FOREIGN PATENT DOCUMENTS

JP      63-6215 U     1/1988
JP      63-59579 U    4/1988
(Continued)

OTHER PUBLICATIONS

International Search Report dated Feb. 21, 2023, issued in counterpart International Application No. PCT/JP2022/047414. (3 pages).
(Continued)

*Primary Examiner* — Bradley Duckworth
(74) *Attorney, Agent, or Firm* — WHDA, LLP

(57) ABSTRACT

A fixing device configured to be used for fixing an article attaching member, to which a desired article or articles is/are attachable, to a fragile wall surface comprises an engagement wall formed to be engaged with a predetermined engaged portion of the article attaching member; a side wall connected to a connecting portion of the engagement wall; and one or more engaging portions formed on a portion of the side wall located at an opposite side to the connecting portion so as to protrude outward from an outer surface of the side wall.

12 Claims, 26 Drawing Sheets

(56) References Cited

U.S. PATENT DOCUMENTS

| | | | | |
|---|---|---|---|---|
| 5,542,641 | A * | 8/1996 | Donovan | A47G 1/1633 |
| | | | | 248/262 |
| 6,830,405 | B2 * | 12/2004 | Watanabe | E04F 13/0846 |
| | | | | 403/14 |
| 7,891,124 | B1 * | 2/2011 | Willis | A47G 1/1606 |
| | | | | 52/235 |
| 11,181,225 | B2 * | 11/2021 | Kawaguchi | F16M 11/041 |
| 11,547,223 | B1 * | 1/2023 | Hassett | A47G 1/17 |
| 11,624,390 | B2 * | 4/2023 | Cogburn | A47G 1/17 |
| | | | | 248/547 |
| 2005/0035264 | A1 * | 2/2005 | Marks | A47G 1/22 |
| | | | | 248/217.2 |
| 2008/0251682 | A1 * | 10/2008 | Repac | F16B 45/008 |
| | | | | 248/304 |
| 2011/0085874 | A1 * | 4/2011 | Davidowitch | A47G 1/22 |
| | | | | 411/82.1 |
| 2016/0235224 | A1 * | 8/2016 | Yang | A47G 1/20 |
| 2023/0375018 | A1 * | 11/2023 | Knapp | F16B 5/0036 |
| 2024/0295287 | A1 * | 9/2024 | Saito | A47G 1/22 |

FOREIGN PATENT DOCUMENTS

| | | |
|---|---|---|
| JP | 2002-168210 A | 6/2002 |
| JP | 3132092 U | 5/2007 |

OTHER PUBLICATIONS

Written Opinion of the International Searching Authority (Form PCT/ISA/237) dated Feb. 21, 2023, issued in counterpart International Application No. PCT/JP2022/047414. (4 pages).

* cited by examiner

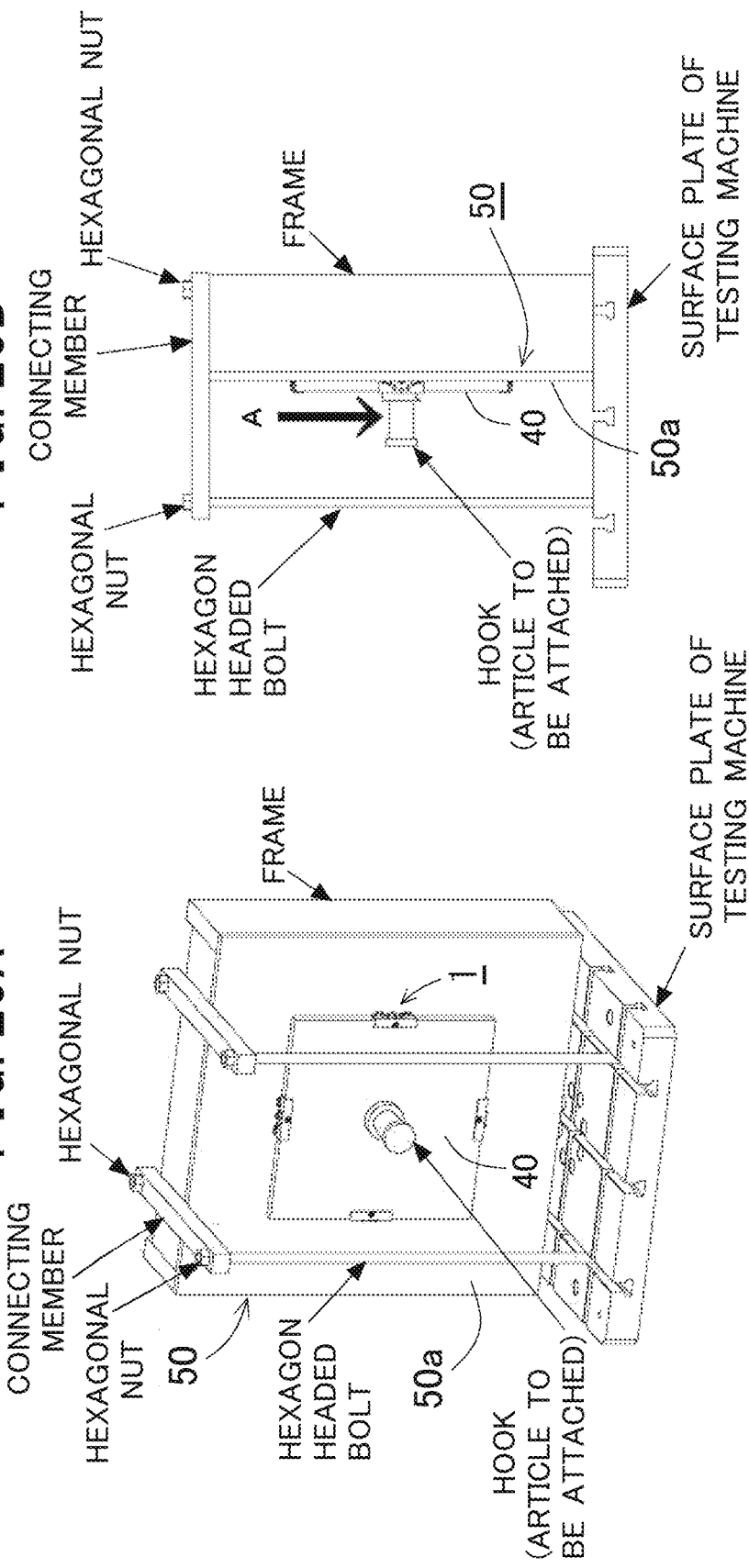

VIEWS SHOWING TEST METHOD OF COMPARATIVE EXAMPLE

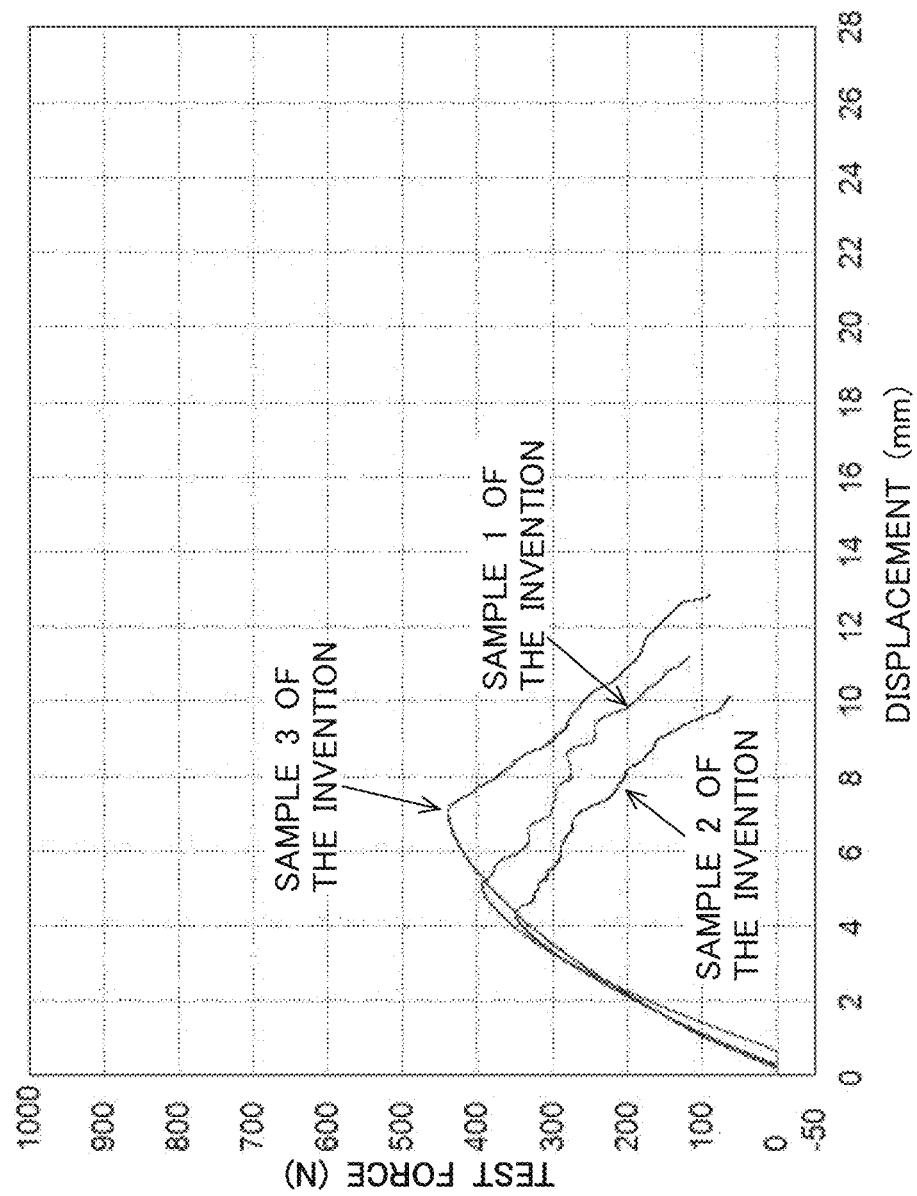

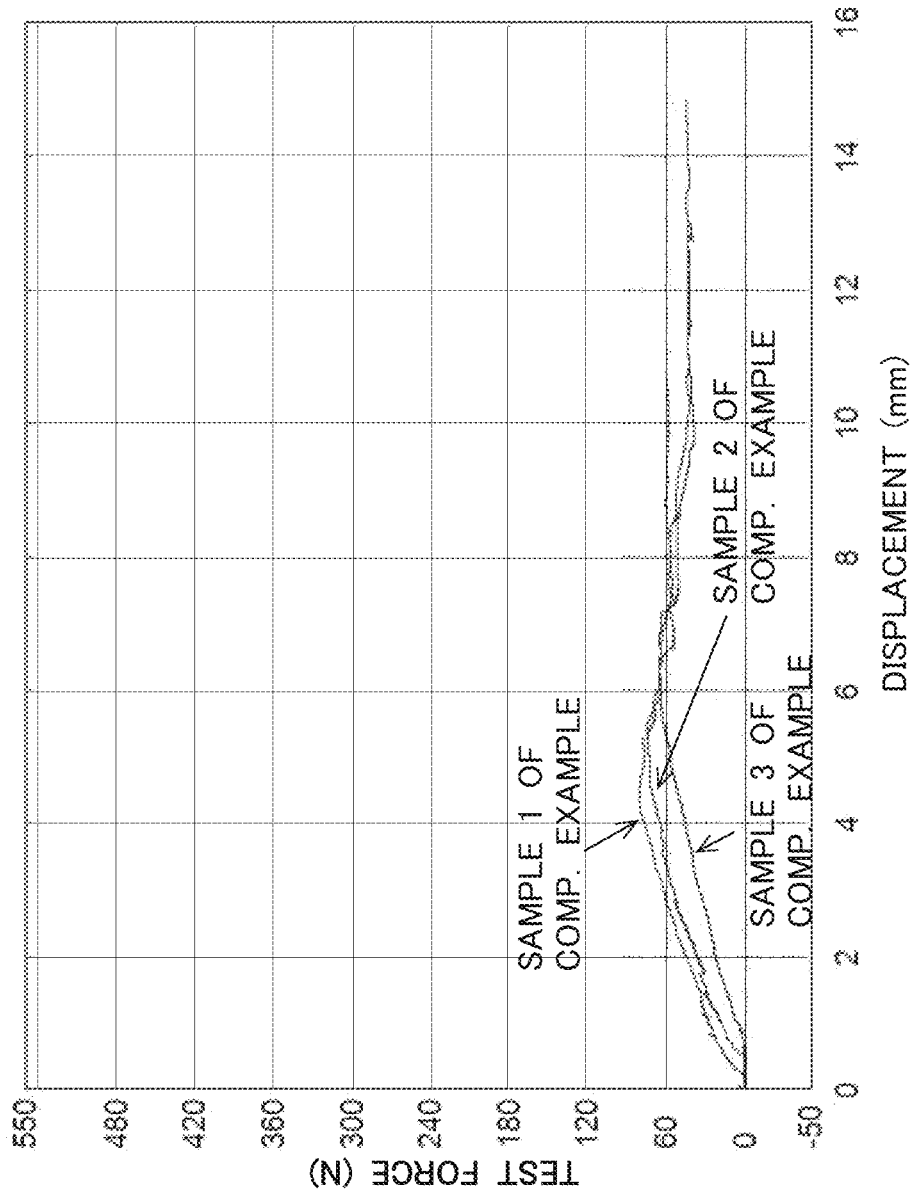

TEST RSULTS OF FIXING DEVICE ACCORDING TO EMBODIMENT
OF THE PRESENT INVENTION AND COMPARATIVE EXAMPLE

FIG. 24

| | TEST MATERIAL | MAXIMUM LOAD (N) | MAXIMUM DISPLACEMENT (mm) | TEST RESULTS |
|---|---|---|---|---|
| INVENTION | SAMPLE 1 | 394.51 | 5.07 | ● No abnormality was observed in the fixing device according to the invention.<br>● No rattling and no displacement occurred in the article attaching member also which was fixed to the wall surface made of the gypsum board using the fixing device according to the invention.<br>● When fixing the fixing member for the hook to the article attachment member, the tapping screws were used instead of the dedicated pins. However, the hook itself (including the fixing member) was not damaged.<br>● The tapping screws used to fix the fixing member for the hook were partially disconnected from (came off) the wall surface made of the gypsum board and was about to fall off. As a result, it was found that the fixing strength of the article attaching member by the fixing device according to the present invention was higher than the fixing strength of the hook itself. |
| | SAMPLE 2 | 348.87 | 4.24 | same as above |
| | SAMPLE 3 | 439.77 | 6.97 | same as above |
| COMPARA-TIVE EXAMPLE | SAMPLE 1 | 80.80 | 4.32 | ● The fixing member for the hook was fixed to the wall surface made of the gypsum board by the pins and therefore, the pins were dropped off from the wall surface. As a result, the hook itself was also dropped off. |
| | SAMPLE 2 | 65.93 | 6.77 | same as above |
| | SAMPLE 3 | 74.85 | 5.47 | same as above | ns
FIXING DEVICE AND FIXING STRUCTURE FOR ARTICLE ATTACHING MEMBER

TECHNICAL FIELD

The present invention relates to a fixing device and a fixing structure for an article attaching member and more particularly, to a fixing device for an article attaching member that makes it possible to realize by easy work attachment of an article or articles using screws, nails, magnetic force, etc. to a wall surface (for example, a wall surface made of gypsum board or the like) (hereinafter also referred to as a fragile wall surface) to which it is difficult to attach an article or articles using screws or nails, and a fixing structure for an article attaching member using the fixing device.

BACKGROUND ART

Gypsum board is a board-shaped construction material made of "gypsum", a mineral made of calcium sulfate and water, as a core material, both surfaces and side faces of which are wrapped with base paper. Gypsum board is widely used as a base material for interior walls, ceilings, etc. at all kinds of construction sites including homes, office buildings, commercial facilities, hotels, and hospitals.

Gypsum board has the characteristic that even when nails or screws are driven into it, they quickly come off, and the gypsum itself crumbles. Therefore, when fixing a desired article (for example, a hook, a hanger, etc.) to a wall surface made of gypsum board, it is necessary to securely attach it using, for example, "gypsum board anchors". However, the use of "gypsum board anchors'" is often undesirable because it creates large holes in the wall surface and these holes are difficult to be repaired. Therefore, devised tools that make it possible to fix an article such as a hook and a hanger to a wall face made of gypsum board without using "gypsum board anchors" have been developed and proposed.

For example, in Patent Literature 1 (Microfilm of Japanese Utility Model Application No. 61/099,031 (Japanese Utility Model Application Publication No. 63-006215)), an article attaching device is disclosed. This article attaching device comprises a main body having a plurality of (for example, three) through holes which are formed in directions obliquely converging with each other from symmetrical sites on a head part thereof to the vicinity of the center of a bottom surface, and a mounting part formed on the head part of the main body. With the mounting part, for example, a cylindrical protrusion having a female screw hole is formed, a female screw hole is formed, or a male screw piece is fixed. The article attaching device is configured in such a way as to be fixed (attached) to a wall surface made of gypsum board by respectively inserting fixing pieces such as nails and screws through the plurality of through holes in the state where the bottom surface is pressed against the wall surface made of gypsum board. Various articles such as hooks, clocks, racks, etc. can be attached to the mounting part according to the necessity.

With the above-mentioned article attaching device of Patent Literature 1, the fixing pieces such as nails and screws which are respectively inserted through the plurality of through holes are pushed into the wall surface along the plurality of through holes, that is, in the directions obliquely converging with each other from the symmetrical sites of the head part to the vicinity of the center of the bottom surface. Therefore, the article attaching device can be fixed (attached) to the wall surface with sufficient strength to hold an article such as a hook, clock, rack, etc. (See Pages 4 to 8 and FIGS. 1 to 7).

As understood from the above description, it can be said that the article attaching device of Patent Literature 1 mentioned above is a device that makes it possible to attach a various article such as a hook, clock, and rack to the device itself (specifically, the head part of the device) and that is configured to be fixed (attached) to the wall surface made of gypsum board by driving the fixing pieces such as nails and screws in the directions obliquely converging with each other.

Furthermore, in Patent Literature 2 (Japanese Patent Application Publication No. 2002-168210), an article fixing structure is disclosed. With this article fixing structure, a plurality of (for example, five) directional guide holes are formed in a bowl-shaped recess, which is formed on the surface of a base body, so as to penetrate obliquely from the inner circumferential slope of the recess toward the back side of the base body, nails inserted respectively into the guide holes are set so as to expand radially in all directions on the back side of the base body, and a cap for holding down the heads of the respective nails thus inserted is configured to be fitted into the recess. The cap, which is removably fitted into the recess, can prevent the nails inserted into the guide holes from coming out. When fixing an object to be fixed, it is sufficient that a facing part formed on the back side of the base body is inserted into an attaching hole of the object, the facing part is put against the wall surface, and nails are respectively inserted and driven into the guide holes. The object is fixed in such a way as to be sandwiched between the base body and the wall surface.

In addition, a through hole for a wood screw is formed at the center of the inner bottom part of the recess. In the case where a crosspiece is placed on the back side of the gypsum board, the base body is fixed by inserting a wood screw through the through hole, thereby making it possible to further reinforce the fixing strength given by the nails.

With the above-mentioned article fixing structure of Patent Literature 2, since the plurality of directional guide holes that penetrate obliquely from the inner circumferential slope of the recess toward the back side of the base body are formed in the recess of the base body, the nails inserted respectively into the guide holes spread radially in all directions to penetrate into the wall surface over a wide area. As a result, an article (the object to be fixed) such as a shelf, hook, handrail, and towel rack can be fixed to a soft wall surface made of gypsum board, thin plywood, or the like with higher strength than the conventional products (in which a plurality of nails are placed closely to each other so as to converge to the vicinity of the center of the bottom surface of a main body). (see Paragraphs 0001, 0004 to 0011, and FIGS. 1 to 9).

As can be understood from the above, with the aforementioned article fixing structure of Patent Literature 2, the fixing strength of the base body is increased by placing the plurality of nails so as to spread radially in all directions on the back side of the base body, that is, on the inside of the wall surface (the inside of the gypsum board). Therefore, the article fixing structure of Patent Literature 2 is common to the aforementioned article attaching device of Patent Literature 1 in this point. However, the article fixing structure of Patent Literature 2 is different form the article attaching device of Patent Literature 1 in the point that the article (the object to be fixed) such as a shelf, hook, handrail, and towel rack is not designed to be attached to the base body itself, but the said article is designed to be sandwiched between the base body and the wall surface made of gypsum board.

PRIOR ART LITERATURE

Patent Literature

Patent Literature 1: Microfilm of Japanese Utility Model Application No. 61/099,031 (Japanese Utility Model Application Publication No. 63-006215)
Patent Literature 2: Japanese Patent Application Publication No. 2002-168210

SUMMARY OF THE INVENTION

Problems to be Resolved by the Invention

By the way, with the aforementioned article attaching device of Patent Literature 1, various articles are designed to be attachable to the said device itself (specifically, the head part of the said device), and the said device is configured to be fixed to the wall surface made of gypsum board by driving the plurality of fixing pieces such as nails and screws in the directions obliquely converging with each other; therefore, the said device can be fixed to the wall surface with sufficient strength. However, the main body is formed, for example, approximately cylindrical, and the female screw hole or the female screw hole part is formed in the mounting part of the head part, or the male screw piece is fixed to the said mounting part. Moreover, the article is designed to be held on the mounting part using the female screw hole, the female screw hole part, or the male screw piece. Accordingly, there is a disadvantage that the article that can be attached (fixed) to the wall surface using the said article attaching device is limited to an article that can be held on the mounting part using a female screw hole, a female screw hole part, or a male screw piece, or something similar thereto.

With the aforementioned article fixing structure of Patent Literature 2, since the plurality of directional guide holes that penetrate obliquely from the inner circumferential slope of the recess toward the back side of the base body are formed in the recess of the base body, the nails inserted respectively into the plurality of guide holes are designed to spread radially in all directions to penetrate into the wall surface over a wide area. For this reason, an article (the object to be fixed) such as a shelf, hook, handrail, and towel rack can be fixed to the wall surface made of gypsum board with higher strength than the conventional structures (in which a plurality of nails are designed to be placed closely to each other so as to converge to the vicinity of the center of the bottom surface of a conical or pyramidal main body). However, the base body has a disc-like shape with the bowl-shaped recess formed on the spherical surface, and various articles are designed to be held so as to be sandwiched between the base body and the wall surface made of gypsum board. Accordingly, there is a disadvantage that the article that can be fixed to the wall surface using the said article fixing structure is limited to an article that can be held so as to be sandwiched between the base body and the wall surface.

Furthermore, with the aforementioned article fixing structure of Patent Literature 2, there is another disadvantage that when trying to fix two or more articles to the wall surface, it is necessary to install the same number of the said article fixing structures as that of the said articles on the wall surface.

Furthermore, with both of the aforementioned article attaching device of Patent Literature 1 and the aforementioned article fixing structure of Patent Literature 2, the idea behind them is that "a desired article is attached or fixed to a desired location on a wall face made of gypsum board using the article attaching device or the base body itself". Therefore, there is a further disadvantage that the article that can be attached or fixed is limited to those having a size, shape, configuration, or weight that allow attachment or fixation to the wall surface using the article attaching device or the base body itself.

The present invention was created while taking the aforementioned circumstances into consideration and its object is to provide a fixing device for an article attaching member that makes it possible to fix an article attaching member, to which a desired article or articles is/are attachable, to a fragile wall surface made of gypsum board or the like with sufficient strength by easy work; and a fixing structure for an article attaching member using the fixing device.

Another object of the present invention is to provide a fixing device for an article attaching member that makes it possible to attach a desired article or articles to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used; and a fixing structure for an article attaching member using the fixing device.

Still another object of the present invention is to provide a fixing device for an article attaching member that makes it possible to significantly expand both the types and number of articles that can be attached to a fragile wall surface made of gypsum board or the like than before; and a fixing structure for an article attaching member using the fixing device.

A further object of the present invention is to provide a fixing device for an article attaching member that makes it possible to provide high convenience not only to users and purchasers of buildings including fragile wall surfaces made of gypsum board or the like but also to builders involved in the construction of this type of buildings; and a fixing structure for an article attaching member using the fixing device.

Other objects of the present invention not specified here will be clarified from the following description and attached drawings.

Means for Solving the Problems (1) A fixing device for an article attaching member according to the present invention is a fixing device configured to be used for fixing an article attaching member, to which a desired article or articles is/are attachable, to a fragile wall surface made of gypsum board or the like, which comprises:
  an engagement wall formed to be engaged with a predetermined engaged portion of the article attaching member;
  a side wall, which is connected to a connecting portion of the engagement wall, formed to intersect with the engagement wall; and
  one or more engaging portions, which is/are formed on the side wall, having guide holes through which nails or pins are respectively inserted to be guided in predetermined directions;

wherein a first part of the guide holes is/are formed to guide one or more inserted nails or pins in a first direction, and a second part of the guide holes is/are formed to guide one or more inserted nails or pins in a second direction which is different from the first direction, one or more of the guide holes that belong to the first part is/are arranged at intervals along an outer surface of the side wall on one side of the side wall;

one or more of the guide holes that belong to the second part is/are arranged at intervals along the outer surface of the side wall on the other side of the side wall;

the engagement wall and the side wall form a space capable of receiving the engaged portion of the article attaching member, and the engaged portion and the engagement wall are configured to be connectable together with a connecting means in a state where the engaged portion is received in the space;

the one or more engaging portions is/are configured to be engaged with the wall surface by inserting respectively nails or pins through the guide holes that belong to the first part and the second part and pushing the nails or pins into the wall surface in a state where the one or more engaging portions is/are contacted with the wall surface;

when fixing the article attaching member at a desired position on the wall surface, the one or more engaging portions is/are engaged with the wall surface by one or more nails or pins which is/are inserted through the one or more of the guide holes that belong to the first part and pushed into the wall surface in the first direction, and one or more nails or pins which is/are inserted through the one or more of the guide holes that belong to the second part and pushed into the wall surface in the second direction; and the engaged portion of the article attaching member received in the space and the engagement wall are connected together by the connecting means, thereby fixing the article attaching member at the desired position.

With the fixing device for an article attaching member according to the present invention, since the above-described configuration is provided, when the one or more engaging portions is/are engaged with the wall surface by pushing one or more nails or pins inserted through the one or more of the guide holes that belong to the first part into the wall surface in the first direction and pushing one or more nails or pins inserted through the one or more of the guide holes that belong to the second part into the wall surface in the second direction which is different from the first direction in the state where the one or more engaging portions is/are contacted with the wall surface, the space which is formed by the engagement wall and the side wall is located on the wall surface. The space is capable of receiving the engaged portion of the article attaching member, and the engaged portion of the article attaching member received in the space is adapted to be engaged with the engagement wall.

Therefore, for example, if the engaged portion of the article attaching member is received in (engaged with) the space and then, in this state, the engaged portion and the engagement wall are connected together by the connecting means before engaging the one or more engaging portions with the wall surface in the above-described manner using nails or pins, it is possible to fix the article attaching member to the wall surface at the desired position by simply engaging the one or more engaging portions with the wall surface.

Alternatively, if the engaged portion of the article attaching member is received in (engaged with) the space after engaging the one or more engaging portions with the wall surface using nails or pins in the aforementioned manner and then, the engaged portion and the engagement wall are connected together by the connecting means in that state, it is possible to fix the article attaching member to the wall surface at the desired position by the one or more engaging portions which have been engaged with the wall surface only.

Further, the guide holes formed in the one or more engaging portions include the first part which is formed to guide one or more inserted nails or pins in the first direction and the second part which is formed to guide one or more inserted nails or pins in the second direction which is different from the first direction. Moreover, the one or more of the guide holes that belong to the first part is/are arranged along the outer surface of the side wall on one side (for example, left side) of the side wall, and the one or more of the guide holes that belong to the second part is/are arranged along the outer surface of the side wall on the other side (for example, right side) of the side wall. Therefore, one or more nails or pins which is/are inserted through the one or more guide holes that belong to the first part and pushed into the wall surface and one or more nails or pins which is/are inserted through the one or more guide holes that belong to the second part and pushed into the wall surface are located at positions (regions) apart (displaced) from each other, and these nails or pins are extended in different directions from each other in the inside of the wall surface. For this reason, the fixing device is mechanically supported on the wall surface by the nails or pins extending in the different directions at the mutually distant (displaced) positions (regions). Accordingly, the mechanical strength when the fixing device is fixed to the wall surface is sufficient.

Moreover, what is required to fix the fixing device to the wall surface is the work of engaging the one or more engaging portions with the wall surface in the aforementioned manner using nails or pins and the work of connecting the engaged portion of the article attaching member and the engagement wall to each other by the connecting means after the engaged portion is received in (engaged with) the space. Therefore, the work required to fix the fixing device to the wall surface is easy.

As a result, with the fixing device according to the present invention, there is an advantageous effect that (a) the article attaching member, to which a desired article or articles is/are attachable, can be fixed to a fragile wall surface made of gypsum board or the like with sufficient mechanical strength by easy work. Regarding this mechanical strength, it has been confirmed by the inventors of the present invention that sufficient mechanical strength to hold the total weight including not only the weight of the article attaching member but also the weight of one or more various articles (articles to be attached) that are assumed to be attached to the article attaching member later can be realized.

Note that it is preferable to use two or more of the fixing devices according to the present invention in combination, depending on the shape and number of the engaged portions of the article attaching member. This is because all the engaged portions of the article attaching member are fixed at two or more places using the two or more fixing devices and thus, the article attaching member can be fixed to the wall surface with higher mechanical strength than the case where the only one fixing device is used, which means that the fixing strength of the article attaching member as a whole can be further increased.

In addition to the above-mentioned advantageous effect, the fixing device according to the present invention has the following advantageous effects also.

Specifically, when the fixing device according to the present invention is used, the article attaching member, to which a desired article or articles is/are attachable, can be fixed to the fragile wall surface made of gypsum board or the like with sufficient mechanical strength and therefore, a desired article or articles can be attached arbitrarily using the article attaching member thus fixed. As a result, with the fixing device according to the present invention, there is another advantageous effect that (b) a desired article or articles can be attached to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used.

Furthermore, when the fixing device according to the present invention is used, the article attaching member, to which a desired article or articles is/are attachable, can be fixed to the fragile wall surface made of the gypsum board or the like with sufficient mechanical strength as described above. Thus, it is possible to attach a desired number of desired articles arbitrarily using the article attaching member which has been fixed in this way. That is, the desired article or articles is/are not directly fixed to the wall surface but is/are fixed to the article attaching member which has been fixed to the wall surface using the fixing device. As a result, by appropriately selecting the shape and/or material of the article attaching member, it is possible to attach a desired article or articles to the wall surface mechanically using screws or nails, or physically using magnetic force or the like. For example, if a wooden board is used as the article attaching member, articles such as hooks and hangers can be attached mechanically using screws or nails. If an iron plate is used as the article attaching member, articles such as hooks and hangers can be attached physically using magnetic force. Furthermore, the number of articles to be attached can be increased up to an allowable value that depends on the size and/or withstand load (the limit of allowable weight) of the article attaching member.

Accordingly, with the fixing device according to the present invention, there is a further advantageous effect that (c) both the types and number of articles that can be attached to a fragile wall surface made of gypsum board or the like can be significantly expanded than before.

Furthermore, when the fixing device according to the present invention is used, the article attaching member, to which a desired article or articles is/are attachable, can be fixed to the fragile wall surface made of gypsum board or the like with sufficient mechanical strength as described above. Thus, it is possible to attach a desired number of desired articles arbitrarily using the article attaching member which has been fixed in this way. This means that convenience of daily life for users and purchasers of buildings including the fragile wall surfaces made of gypsum board or the like is increased dramatically by simple work of purchasing the fixing device and fixing it to the wall surface only.

Additionally, for builders involved in the construction of this type of building, this means that there is an added benefit of "improving the convenience of daily life" for the users and purchasers of this type of building (although some additional cost is required) by simply adding the work of installing the fixing device at an appropriate location on the fragile wall surface made of gypsum board or the like during interior construction. Therefore, regarding buildings including the gypsum board (or similar materials) which has the property of being inexpensive but extremely structurally strong and the high heat and sound insulation properties, builders can appeal to potential customers through advertisements and promotions with the following message: Not only the problem of the gypsum board (and its similar products) that "it is difficult to attach articles using screws or nails" is solved but also the property of high convenience that "you can attach as many desired articles as you like directly to the wall surface, even if you do not use any product that has been devised to enable fixation of an article to the wall surface made of gypsum board" is obtainable. This means that the convenience for builders is high as well.

Accordingly, with the fixing device according to the present invention, there is a still further advantageous effect that (d) high convenience can be provided not only to users and purchasers of buildings including fragile wall surfaces made of gypsum board or the like but also to builders involved in the construction of this type of buildings.

(2) In a preferred embodiment of the fixing device for an article attaching member according to the present invention, the connecting means for connecting the engaged portion and the engagement wall together is a screw member having a male thread (for example, a wood screw, a tapping screw, a bolt, and the like).

In this embodiment, the fixing device can be connected to the engaged portion by simply screwing the screw member into the engaged portion so as to pass through the engagement wall in the state where the engaged portion is received in the space. Therefore, there is an additional advantage that the work of connecting the engaged portion and the engagement wall together is very simple. In this case, in order to facilitate the work of screwing the screw member into the engaged portion so as to penetrate the engagement wall, it is preferred that a through hole through which the screw member passes be formed in advance in the engagement wall.

(3) In another preferred embodiment of the fixing device for an article attaching member according to the present invention, the connecting means for connecting the engaged portion and the engagement wall together is a connecting nail or pin.

In this embodiment, the fixing device can be connected to the engaged portion by simply pressing (driving) the connecting nail or pin (which is different from the nails or pins for engaging the first engaging portion or the second engaging portion) into the engaged portion so as to pass through the engagement wall in the state where the engaged portion is received in the space. Therefore, there is an additional advantage that the work of connecting the engaged portion and the engaging wall together is very simple. In this case, in order to facilitate the work of pressing the connecting nail or pin into the engaged portion so as to penetrate the engagement wall, it is preferred that a through hole through which the connecting nail or pin passes be formed in advance in the engagement wall.

(4) In a further preferred embodiment of the fixing device for an article attaching member according to the present invention, the connecting means for connecting the engaged portion and the engagement wall together is a glue or adhesive.

In this embodiment, the fixing device can be connected to the engaged portion by simply disposing the glue or adhesive between the engagement wall and the engaged portion in the state where the engaged portion is received in the space. Therefore, there is an additional advantage that the work of connecting the engaged portion and the engagement wall together is very simple.

(5) In a still further preferred embodiment of the fixing device for an article attaching member according to the present invention, the connecting means for connecting the engaged portion and the engagement wall together is a magnet.

In this embodiment, for example, if small magnets are arranged or buried in the engaged portion and the engagement wall, respectively, the fixing device can be connected to the engaged portion by magnetic force in the state where the engaged portion is received in the space. Therefore, there is an advantage that the work of connecting the engaged portion and the engagement wall together is very simple (almost unnecessary). It should be noted that when the article attaching member itself is made of iron or at least the engaged portion is made of iron, it is sufficient to simply embed the magnet in the engagement wall, which provides convenience.

(6) In a still further preferred embodiment of the fixing device for an article attaching member according to the present invention, as the one or more engaging portions, a first engaging portion formed at one end of the side wall or in a vicinity thereof, and a second engaging portion formed at the other end of the side wall or in a vicinity thereof are included;

wherein the one or more of the guide holes that belong to the first part is/are disposed in the first engaging portion, and a slope which is approximately perpendicular to the first direction is formed on a surface of the first engaging portion; and the one or more of the guide holes that belong to the second part is/are disposed in the second side wall, and a slope which is approximately perpendicular to the second direction is formed on a surface of the second engaging portion.

In this embodiment, since the first engaging portion having the one or more of the guide holes for guiding one or more inserted nails or pins in the first direction is formed at one end of the side wall or in a vicinity thereof, and the second engaging portion having the one or more of the guide holes for guiding one or more inserted nails or pins in the second direction is formed at the other end of the side wall or in a vicinity thereof, the first engaging portion and the second engaging portion are located at positions sufficiently apart from each other. Therefore, the worker can grasp the positions of the first and second engaging portions securely.

Moreover, since the slope approximately perpendicular to the first direction is formed on the surface of the first engaging portion having the one or more of the guide holes for guiding one or more inserted nails or pins in the first direction, the worker can easily recognize the fact that the one or more of the guide holes formed in the first engaging portion is/are prepared for guiding one or more inserted nails or pins in the first direction. This also applies to the second engaging portion.

Therefore, there is an advantage that when the worker inserts one or more nails or pins, there is no possibility that the worker gets confused or makes a mistake in the insertion direction or driving direction after insertion.

(7) In a still further preferred embodiment of the fixing device for an article attaching member according to the present invention, in addition to the first part and the second part, the guide holes include a third part formed to guide one or more inserted nails or pins in a third direction which is different from the first direction and the second direction;

one or more of the guide holes that belong to the third part is/are located along the outer surface of the side wall in a central portion of the side wall or in a vicinity thereof;

the one or more engaging portions is/are configured to be engaged with the wall surface by inserting respectively nails or pins through the guide holes that belong to the first part, the second part, and the third part and pushing the nails or pins into the wall surface in a state where the one or more engaging portions is/are contacted with the wall surface;

when fixing the article attaching member at the desired position on the wall surface, the one or more engaging portions is/are engaged with the wall surface by one or more nails or pins which is/are inserted through the one or more of the guide holes that belong to the first part and pushed into the wall surface in the first direction, one or more nails or pins which is/are inserted through the one or more of the guide holes that belong to the second part and pushed into the wall surface in the second direction, and one or more nails or pins which is/are inserted through the one or more of the guide holes that belong to the third part and pushed into the wall surface in the third direction; and the engaged portion of the article attaching member received in the space and the engagement wall are connected together by the connecting means, thereby fixing the article attaching member at the desired position.

In this embodiment, since the guide holes formed in the one or more engaging portions include the third part formed to guide one or more inserted nails or pins in the third direction which is different from the first and second directions in addition to the first part formed to guide one or more inserted nails or pins in the first direction and the second part formed to guide one or more inserted nails or pins in the second direction. Moreover, the one or more guide holes that belong to the third part is/are located along the outer surface of the side wall at a central portion of the side wall or in a vicinity thereof. Therefore, one or more nails or pins is/are pushed into the wall face at different positions in a different direction from those of the first part and the second part. Accordingly, there is an advantage that the mechanical strength when the fixing device is fixed to the wall surface is higher than the case where the fixing device does not include the third portion.

(8) In a still further preferred embodiment of the fixing device for an article attaching member according to the present invention, a slope which is approximately perpendicular to the third direction is formed on a surface of the third engaging portion.

In this embodiment, since the slope which is approximately perpendicular to the third direction is formed on the surface of the third engaging portion having the one or more guide holes for guiding one or more inserted nails or pins in the third direction, the worker can easily recognize the fact that the one or more guide holes formed in the third engaging portion is/are prepared for guiding one or more inserted nails or pins in the third direction.

Therefore, there is an additional advantage that when the worker inserts nails or pins through the guide holes formed in each of the first engaging portion, the second engaging portion, and the third engaging portion, there is no possibility that the worker gets confused or makes a mistake in the insertion direction or driving direction after insertion although the first, second, and third engaging portions are formed on the side wall.

(9) In a still further preferred embodiment of the fixing device for an article attaching member according to the present invention, the guide holes of the first engaging portion are inclined toward an inner side of the side wall and inclined toward a center of the side wall along the outer surface of the side wall, and tips of nails or pins that are entirely inserted through the guide holes of the first engaging portion are located inside the side wall; and the guide holes of the second engaging portion are inclined toward the inner side of the side wall and inclined toward the center of the side wall along the outer surface of the side wall, and tips of nails or pins that are entirely inserted through the guide holes of the second engaging portion are located inside the side wall.

In this embodiment, tips of nails or pins which are entirely inserted through the guide holes of the first engaging portion, which are inclined toward the inner side of the side wall and inclined toward the center of the side wall along the outer surface of the side wall, are located inside the side wall, and tips of nails or pins which are entirely inserted through the guide holes of the second engaging portion, which are inclined toward the inner side of the side wall and inclined toward the center of the side wall along the outer surface of the side wall, are located inside the side wall. Thus, the nails or pins are more difficult to be fallen off from the wall face. Therefore, there is an advantage that the mechanical strength when the fixing device is fixed to the wall surface can be increased with a simple configuration.

(10) In a still further preferred embodiment of the fixing device for an article attaching member according to the present invention, the guide holes of the first engaging portion are inclined toward an inner side of the side wall and inclined toward a center of the side wall along the outer surface of the side wall, and tips of nails or pins that are entirely inserted through the guide holes of the first engaging portion are located inside the side wall;

the guide holes of the second engaging portion are inclined toward the inner side of the side wall and inclined toward the center of the side wall along the outer surface of the side wall, and tips of nails or pins that are entirely inserted through the guide holes of the second engaging portion are located inside the side wall; and the one or more guide holes of the third engaging portion is/are inclined toward the inner side of the side wall and inclined in a direction perpendicular to the connecting portion along the outer surface of the side wall, and tips of nails or pins that are entirely inserted through the one or more guide holes of the second engaging portion are located inside the side wall.

In this embodiment, tips of nails or pins entirely inserted through the guide holes of the first engaging portion, which are inclined toward the inner side of the side wall and inclined toward the center of the side wall along the outer surface of the side wall, are located inside the side wall, and tips of nails or pins entirely inserted through the guide holes of the second engaging portion, which are inclined toward the inner side of the side wall and inclined toward the center of the side wall along the outer surface of the side wall, are located inside the side wall. Moreover, one or more tips of nails entirely inserted through the one or more guide holes of the third engaging portion, which is/are inclined toward the inner side of the side wall and inclined in the direction perpendicular to the connecting portion along the outer surface of the side wall, are located inside the side wall. Thus, nails or pins are more difficult to be fallen off from the wall face than the case where only the first and second engaging portions are provided. Therefore, there is an advantage that the mechanical strength when the fixing device is fixed to the wall surface can be further increased with a simple configuration.

(11) A fixing structure for an article attaching member according to the present invention comprises:

the fixing devices for an article attaching member according to the present invention described in any one of (1) to (10) above;

wherein in each of the fixing devices, the one or more engaging portions, which is/are in contact with the wall surface, are fixed to the wall surface by nails or pins which are inserted through the one or more of the guide holes that belong to the first part and pushed into the wall surface in the first direction, and nails or pins which are inserted through the one or more of the guide holes that belong to the second part and pushed into the wall surface in the second direction; and the engaged portion of the article attaching member received in the space and the engagement wall are connected together by the connecting means, whereby the article attaching member is fixed at the desired position.

With the fixing structure for an article attaching member according to the present invention, a plurality of the fixing devices for an article attaching member according to the present invention described in any one of (1) to (10) above are included. In each of the fixing devices, as explained above, the one or more engaging portions are engaged with the wall surface by nails or pins which are inserted through the one or more of the guide holes that belong to the first part and the one or more of the guide holes that belong to the second part, and at the same time, the engagement wall is connected to the engaged portion of the article attaching member received in the space by the connecting means, thereby fixing the article attaching member at the desired position. Therefore, for the same reason as mentioned above regarding the fixing device for an article attaching member according to the present invention, there is an advantageous effect that (a) the article attaching member, to which a desired article or articles is/are attachable, can be fixed with sufficient strength to a fragile wall made of gypsum board or the like by easy work. Regarding this mechanical strength, it has been confirmed by the inventors of the present invention that sufficient mechanical strength to hold the total weight including not only the weight of the article attaching member but also the weight of one or more various articles (articles to be attached) that are assumed to be attached to the article attaching member later can be realized.

In addition to the above-mentioned advantageous effect, the fixing structure for an article attaching member according to the present invention has the following advantageous effects also.

Specifically, when the fixing structure for an article attaching member according to the present invention is used, as described above, the article attaching member, to which a desired article or articles is/are attachable, can be fixed to the fragile wall surface made of gypsum board or the like with sufficient mechanical strength using the fixing devices. Thus, a desired article or articles can be attached arbitrarily using the article attaching member thus fixed. As a result, with the fixing structure according to the present invention, there is another advantageous effect that (b) a desired article or articles can be attached to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used.

Furthermore, when the fixing structure according to the present invention is used, the article attaching member, to which a desired article or articles is/are attachable, can be fixed to the fragile wall surface made of the gypsum board or the like with sufficient mechanical strength using the fixing devices as described above. Thus, it is possible to attach a desired number of desired articles arbitrarily using the article attaching member which has been fixed in this way. That is, the desired article or articles is/are not directly fixed to the wall surface but is/are fixed to the article attaching member which has been fixed to the wall surface using the fixing devices. As a result, by appropriately selecting the shape and/or material of the article attaching member, it is possible to attach a desired article or articles to the wall surface mechanically using screws or nails, or physically using magnetic force or the like. For example, if a wooden board is used as the article attaching member, articles such as hooks and hangers can be attached mechanically using screws or nails. If an iron plate is used as the article attaching member, articles such as hooks and hangers can be attached physically using magnetic force. Furthermore, the number of articles to be attached can be increased up to an allowable value that depends on the size and/or withstand load (the limit of allowable weight) of the article attaching member.

Accordingly, with the fixing structure according to the present invention, there is a further advantageous effect that (c) it is possible to significantly expand both the types and number of articles that can be attached to a fragile wall surface made of gypsum board or the like than before.

Furthermore, when the fixing structure according to the present invention is used, the article attaching member, to which a desired article or articles is/are attachable, can be fixed to the fragile wall surface made of gypsum board or the like with sufficient mechanical strength as described above. Thus, it is possible to attach a desired number of desired articles arbitrarily using the article attaching member which has been fixed in this way. This means that convenience of daily life for users and purchasers of buildings including the fragile wall surfaces made of gypsum board or the like is increased dramatically by simple work of purchasing the fixing devices and fixing them to the wall surface only.

Additionally, for builders involved in the construction of this type of building, this means that there is an added benefit of "improving the convenience of daily life" for the users and purchasers of this type of building (although some additional cost is required) by simply adding the work of installing the fixing devices at appropriate locations on the fragile wall surface made of gypsum board or the like during interior construction. Therefore, regarding buildings including the gypsum board (or similar materials) which has the property of being inexpensive but extremely structurally strong and the high heat and sound insulation properties, builders can appeal to potential customers through advertisements and promotions with the following message: Not only the problem of the gypsum board (and its similar products) that "it is difficult to attach articles using screws or nails" is solved but also the property of high convenience that "you can attach as many desired articles as you like directly to the wall surface, even if you do not use any product that has been devised to enable fixation of an article to the wall surface made of gypsum board" is obtainable. This means that the convenience for builders is high as well.

Accordingly, with the fixing structure according to the present invention, there is a still further advantageous effect that (d) high convenience can be provided not only to users and purchasers of buildings including fragile walls made of gypsum board or the like but also to builders involved in the construction of this type of buildings.

(12) In a preferred embodiment of the fixing structure for an article attaching member according to the present invention, the article attaching member is a plate-like member made of wood, iron, or synthetic resin.

In this embodiment, when the article attaching member is formed by a wooden plate-like member, one or more desired articles (for example, hooks, hangers, etc.) can be attached to the article attaching member mechanically using pins or nails; when the article attaching member is formed by an iron plate-like member, one or more desired articles can be attached to the article attaching member physically using magnetic force; and when the article attaching member is formed by a plate-like member made of synthetic resin, one or more desired articles can be attached to the article attaching member physically using an adhesive. Therefore, there is an advantage that it is possible to freely attach one or more desired articles (for example, hooks, hangers, etc.) in the same manner as the case where the wall face is made of wood or iron, even though the wall face is actually made of gypsum board.

(13) In the present invention, the material of the "fixing device" can be set arbitrarily as long as it provides a rigidity that can realize sufficient mechanical strength to support the total weight including not only the weight of the article attaching member but also the weight of one or more various articles (articles to be attached) that are assumed to be attached to the article attaching member later. For example, it is preferable to use ABS resin which is excellent in terms of rigidity, impact resistance, and ease of processing, or a synthetic resin that has physical properties similar to ABS resin. However, it is not limited to these materials. Synthetic resins other than these materials can also be used, and metal materials can also be used.

In the present invention, the "article attaching member" means a member to which a desired article or articles (hereinafter also referred to as an article or articles to be attached) is attached, and its shape and material are arbitrary. The desired article or articles may be directly attached to the "article attaching member" using pins, nails, magnetic force, etc., or indirectly attached to the "article attaching member" via an appropriate member or device. However, the desired article or articles may be attached by any method.

Taking the fact that the "article attaching member" is fixed to the wall surface into consideration, the "article attaching member" is usually plate-shaped or approximately plate-shaped; however, it is not limited to a plate-like shape or an approximately plate-like shape. It goes without saying that any shape other than a plate-like shape may be used depending on a desired location on the wall surface to which the "article attaching member" is fixed.

The material of the "article attaching member" is preferably a plate-like member made of wood or iron. This is because a desired article or articles is/are often mechanically attached to the wall surface using pins or nails, and if this point is considered important, it is preferable to use a wooden member. Furthermore, this is also because a desired article or articles are often physically attached to the wall surface using magnetic force, and if this point is considered important, it is preferable to use an iron member.

In the present invention, the "article" to be attached to the "article attaching member" is any article that is often attached to the wall surface. For example, many articles such as hooks, hangers, racks, clocks, handrails, towel racks, etc. are used as the "article". The "article" may be directly attached to the "article attaching member" using screws or nails or may be attached thereto via some kind of device that facilitates attachment of an article or articles.

Advantageous Effects of the Invention

With the fixing device for an article attaching member of the present invention and the fixing structure for an article attaching member using the fixing devices, there are the advantageous effects that (a) an article attaching member, to which a desired article or articles is/are attachable, can be fixed to a fragile wall surface made of gypsum board or the like with sufficient mechanical strength by easy work; (b) a desired article or articles can be attached to a fragile wall surface made of gypsum board or the like even if the products such as the aforementioned article attaching device of Patent Literature 1 and the aforementioned article fixing structure of Patent Literature 2, which are devised to enable fixation of an article such as a hook and hanger to a wall surface made of gypsum board without using the "gypsum board anchor", are not used: (c) both the types and number of articles that can be attached to a fragile wall surface made of gypsum board or the like can be significantly expanded than before; and (d) high convenience can be provided not only to users and purchasers of buildings including fragile walls made of gypsum board or the like but also to builders involved in the construction of this type of buildings.

BRIEF DESCRIPTION OF THE DRAWINGS

FIG. 20A is a perspective view showing the test method of the efficacy confirmation test of the fixing device for an article attaching member shown in FIGS. 1 to 6.

FIG. 20B is a right side view showing the test method of the efficacy confirmation test of the fixing device for an article attaching member shown in FIGS. 1 to 6.

FIG. 22 is a graph showing the test result of the efficacy confirmation test of the fixing device for an article attaching member shown in FIGS. 1 to 6.

FIG. 23 is a graph showing the test result of the efficacy confirmation test of the comparative example.

FIG. 24 is a table showing the test results of the efficacy confirmation tests of the fixing device for an article attaching member shown in FIGS. 1 to 6 and the comparative example.

EMBODIMENTS FOR CARRYING OUT THE INVENTION

Figure 1:
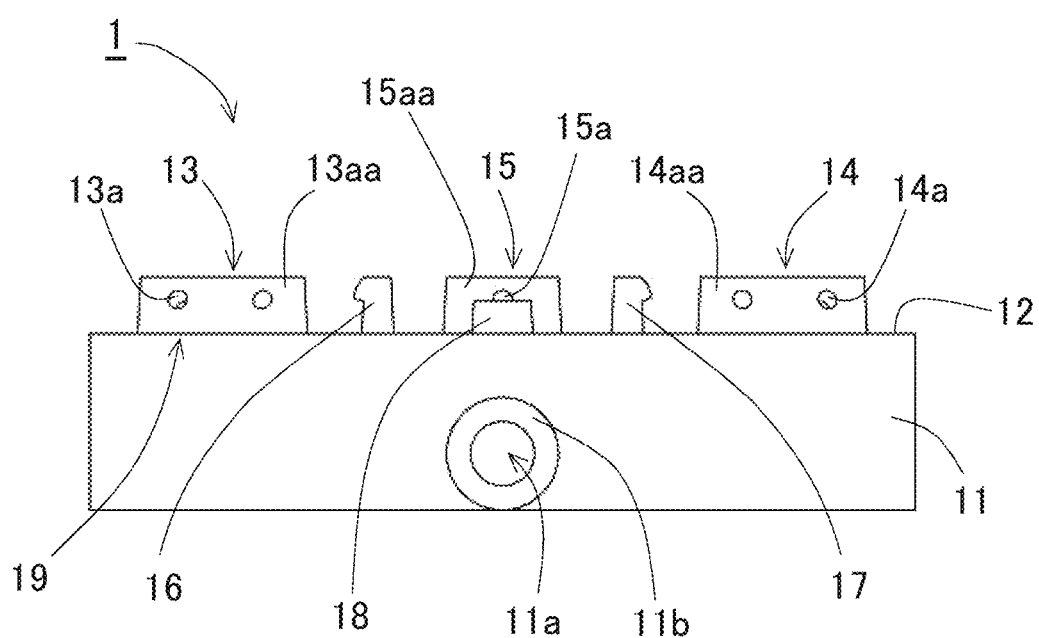
FIG. 1 is a front view of a fixing device for an article attaching member according to an embodiment of the present invention.
Figure 2:
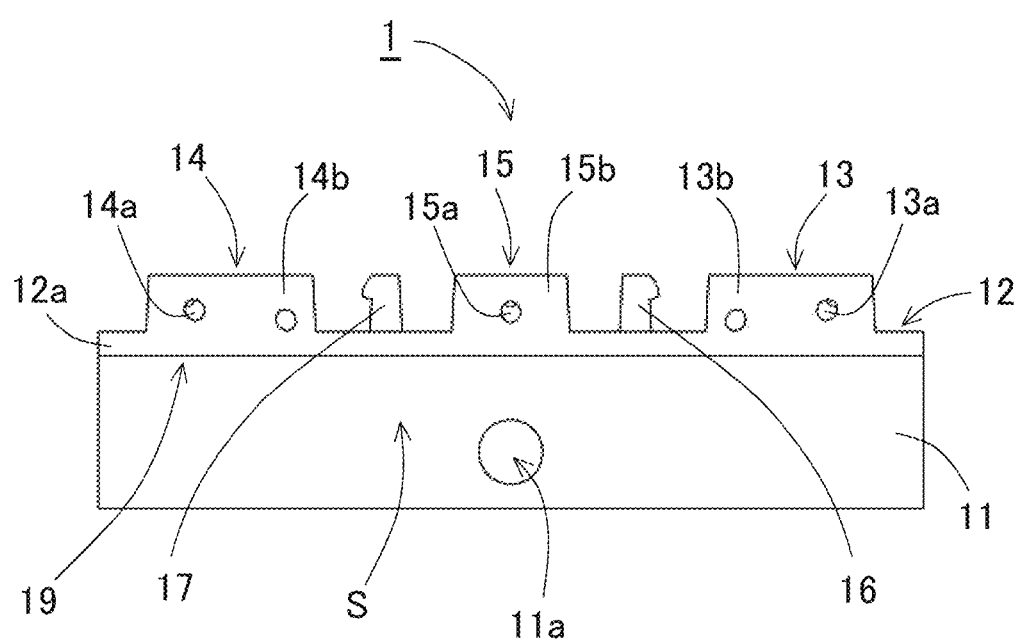
FIG. 2 is a rear view of the fixing device for an article attaching member shown in FIG. 1.
Figure 3A:
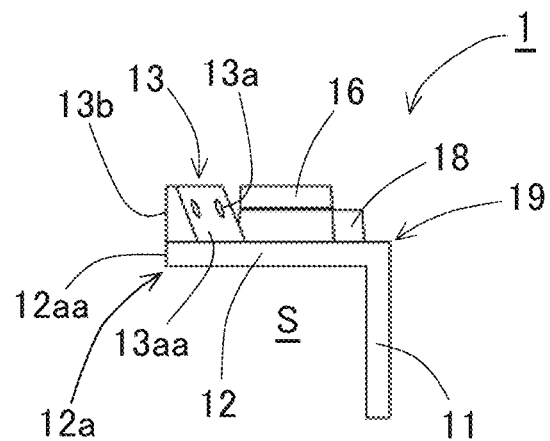
FIG. 3A is a left side view of the fixing device for an article attaching member shown in FIG. 1.
Figure 3B:
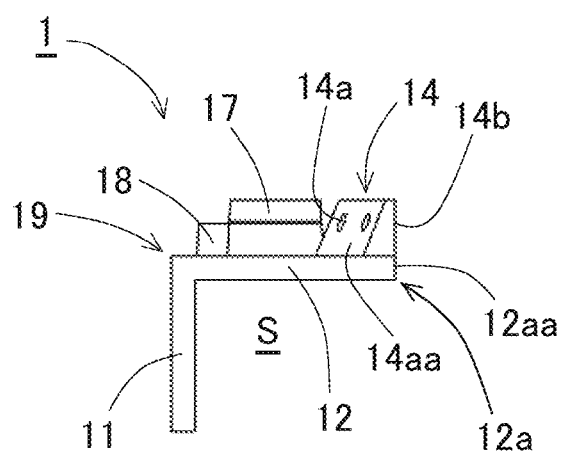
FIG. 3B is a right side view of the fixing device for an article attaching member shown in FIG. 1.
Figure 4:
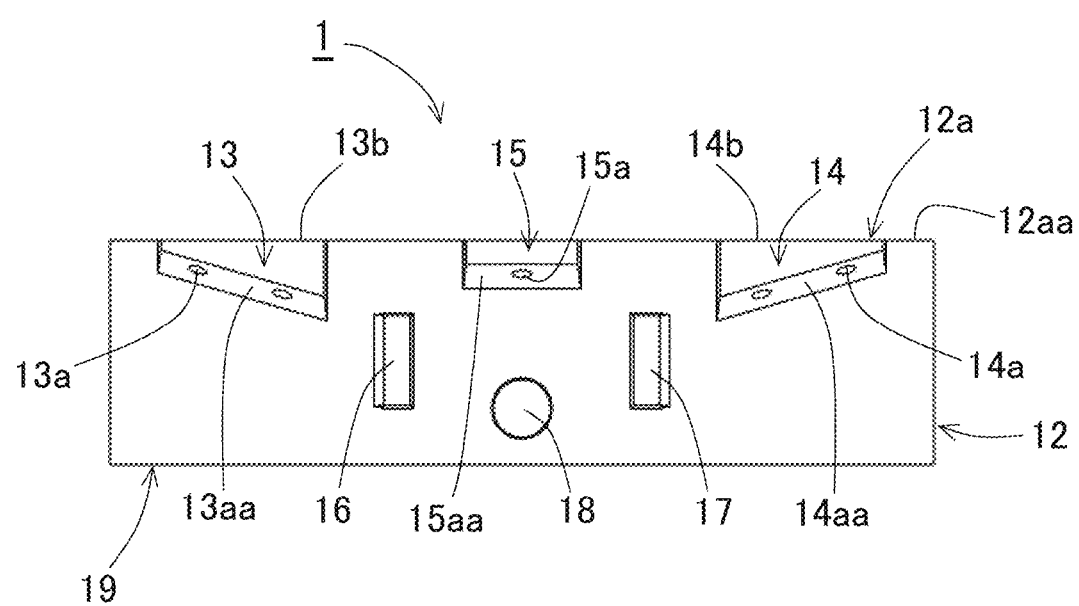
FIG. 4 is a plan view of the fixing device for an article attaching member shown in FIG. 1.
Figure 5:
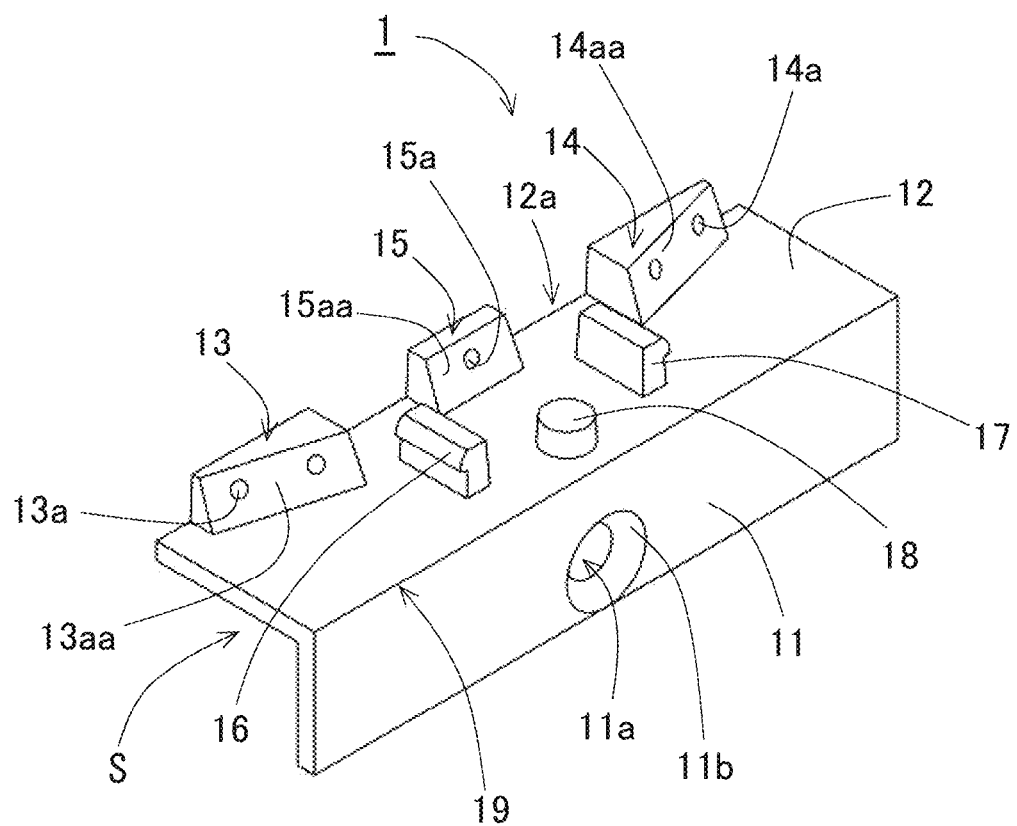
FIG. 5 is a perspective view of the fixing device for an article attaching member shown in FIG. 1, which is seen from the diagonal upper front.
Figure 6:
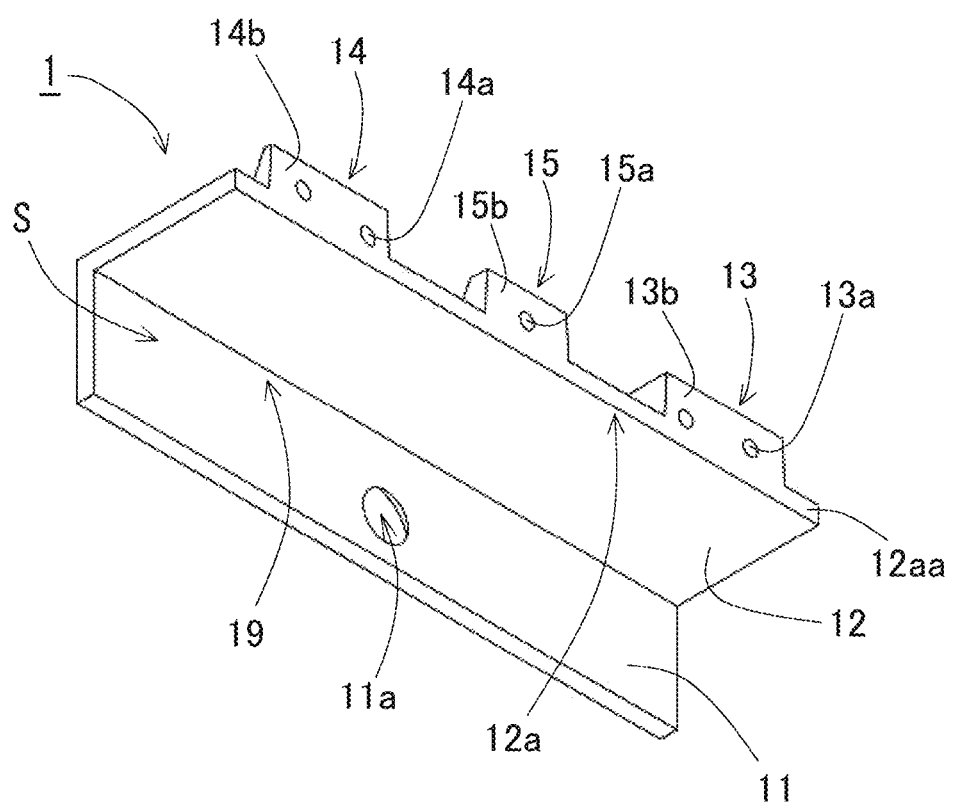
FIG. 6 is a perspective view of the fixing device for an article attaching member shown in FIG. 1, which is seen from the diagonal lower rear.

Hereinafter, preferred embodiments of the present invention will be described with reference to the accompanying drawings.
(Configuration of Fixing Device for Article Attaching Member)

First, the configuration of a fixing device 1 for an article attaching member according to an embodiment of the present invention will be described with reference to the accompanying drawings.

As shown in FIGS. 1 to 6, the fixing device 1 for an article attachment member according to the present embodiment has a rectangular plate-shaped engagement wall 11 on its one surface (the front surface, that is, the surface on the opposite side to a wall surface 50a when fixed to the wall surface 50a). This is because the fixing device 1 is intended to fix a rectangular plate-shaped article attaching member 40 (see FIGS. 10 and 23) to the wall surface 50a made of a gypsum board 50 (see FIGS. 9 and 10) by engaging one side edge of the article attaching member 40 that serves as an engaged portion 41 thereof. The surface opposite to the engagement wall 11 (the back surface, that is, the surface on the same side as the wall surface 50a when fixed to the wall surface 50a) has no engagement wall and is open to the outside.

Here, the fixing device 1 is made of a synthetic resin that has physical properties similar to ABS resin (synthetic resin obtained by copolymerizing acrylonitrile, butadiene, and styrene) which has high rigidity and high impact resistance, and which is easy to be processed. However, it is not limited to this resin. It goes without saying that the device 1 can also be produced using another synthetic resin having similar properties (rigidity, impact resistance, ease of processing, etc.) to this resin.

A side edge corresponding to one long side of the rectangular engagement wall 11 is formed as a connecting portion 19, and a side edge corresponding to one long side of a rectangular plate-like side wall 12 is connected to the connecting portion 19. The connection angle between the side edge of the engagement wall 11 and the side edge of the side wall 12 is a right angle. This is to create a state in which the side wall 12 extends along, for example, an upper side face 40b of the article attachment member 40 while the engagement wall 11 is contacted and engaged with a surface 40a of the member 40 having a rectangular plate-like shape. Therefore, the fixing device 1 for an article attachment member according to the present embodiment includes the rectangular plate-shaped engagement wall 11 and the rectangular plate-shaped side wall 12 that are connected together at a right angle at the connecting portion 19 and has a cross section of an approximately L-shape as a whole.

As described above, the side edge of the side wall 12 corresponding to its long side and the side edge of the engagement wall 11 corresponding to its long side are connected together at the connecting portion 19 and thus, the connecting portion 19 is extended parallel to the long sides (long axes) of both the side wall 12 and the engagement wall 11 and is perpendicular to short sides (short axes) of both the side wall 12 and the engagement wall 11.

On the back side of the engagement wall 11, a space S defined by the engagement wall 11 and the side wall 12 is formed. The space S is prepared for receiving one of the engaged portions 41 of the article attachment member 40. The size of the space S is determined such that one side edge (which has a rectangular cross section) as an engaged portion 41 of a rectangular plate-shaped article attaching member 40 (see FIG. 25) which will be described later can be inserted into the space S, and the inserted engaged portion 41 (the aforementioned side edge) can be engaged with and held by the engagement wall 11 and the side wall 12 from two directions.

The side edge corresponding to the other long side of the engagement wall 11 (the side edge on the opposite side to the connecting portion 19), to which any other side wall is not connected, is open to the outside. The two side edges corresponding to the two short sides of the engagement wall 11 also, to which any other side walls are not connected, are open to the outside. A side edge portion 12a corresponding to the other long side of the side wall 12 (a side edge portion on the opposite side to the connecting portion 19) also, to which any other side wall is not connected, and the two side edges corresponding to the two short sides of the side wall 12 also, to which any other side walls are not connected, are open to the outside. This is to allow one side edge of the article attachment member 40 as the engaged portion 41 thereof to be received in the space S.

A through hole 11a, into which a wood screw 30 is screwed, is formed in the engagement wall 11 at a central portion thereof near the side edge on the opposite side to the connecting portion 19. By screwing a wood screw 30 into the through hole 11a from the outside of the engagement wall 11, the engagement wall 11 and thus the fixing device 1 can be connected to the corresponding engaged portion 41 of the article attachment member 40 which is engaged in the space S. The wood screw 30 constitutes a connecting means for connecting the engagement wall 11 and the engaged portion 41 together.

A tapered face 11b is formed around the through hole 11a. The through hole 11a and the tapered face 11b are formed to approximately match the outer shape of the head of the wood screw 30. Thus, by screwing the wood screw 30 into the through hole 11a from the outside of the engagement wall 11, the threaded portion of the wood screw 30 is pushed into the engaged portion 41 and the head of the wood screw 30 is embedded within the engagement wall 11 (see FIGS. 8 and 9). Therefore, there is an advantage that since the head of the wood screw 30 does not protrude outside the engagement wall 11, there is no risk of injury to the worker who fixes the article attaching member 40 to the wall surface 50a using the fixing device 1 and to the user of the article attaching member 40 thus fixed.

On the side edge portion 12a of the side wall 12 which is located on the opposite side to the connecting portion 19 (on the back surface side of the fixing device 1), a first engaging portion 13, a second engaging portion 14, and a third engaging portion 15 are respectively formed as band-shaped parts that slightly protrude outward from the outer surface of the side wall 12. The first, second, and third engaging portions 13, 14, and 15 are arranged at intervals along the connecting portion 19 (side edge portion 12a) on the side edge portion 12a of the side wall 12. The first, second, and third engaging portions 13, 14, and 15 are formed symmetrically with respect to the center line of the side wall 12 (which is a straight line that passes through the center of the outer surface of the side wall 12 and that is parallel to the two short sides (short axes) of the side wall 12, not shown).

The first engaging portion 13, which is formed integrally with the side wall 12 on the outer surface of the side wall 12, is formed like a truncated pyramid-shaped protrusion that extends at a constant height (length from the outer surface of the side wall 12) along the connecting portion 19. The first engaging portion 13 has a approximately trapezoidal cross section along the outer surface of the side wall 12. Further, the width (length along the outer surface of the side wall 12) of the first engaging portion 13 gradually changes along the connecting portion 19, in which the end of the first engaging portion 13 on the same side as the third engaging portion 15 is thicker and the end of the portion 13 on the opposite side to the portion 15 is thinner. The degree to which the aforementioned width changes is determined so as to reflect the extending direction (first direction) of guide holes 13a which will be described later. A slope 13aa is formed on the surface side of the first engaging portion 13. The slope 13aa has an obtuse inclination angle with respect to the outer surface of the side wall 12. The inclination direction and inclination angle of the slope 13aa are also determined so as to reflect the extending direction (first direction) of the guide holes 13a which will be described later.

The second engaging portion 14 is formed symmetrically with the first engaging portion 13 with respect to the aforementioned center line of the side wall 12. That is, the second engaging portion 14 is located on the opposite side to the first engaging portion 13 with respect to the aforementioned center line, and the second engaging portion 14 and the first engaging portion 13 are equidistant from the said center line. Further, the shape of the second engaging portion 14 is symmetrical with the shape of the first engaging portion 13 (which is a shape as a mirror image of the first engaging portion 13 with respect to the said center line).

Specifically, similar to the first engaging portion 13, the second engaging portion 14, which is also formed integrally with the side wall 12 on the outer surface of the side wall 12, is formed like a truncated pyramid-shaped protrusion that extends at a constant height (length from the outer surface of the side wall 12) along the connecting portion 19. The second engaging portion 14 has an approximately trapezoidal cross section along the outer surface of the side wall 12. Further, the width (length along the outer surface of the side wall 12) of the second engaging portion 14 gradually changes along the connecting portion 19, in which the end of the second engaging portion 14 on the same side as the third engaging portion 15 is thicker and the end of the portion 14 on the opposite side to the portion 15 is thinner. The degree to which the aforementioned width changes is determined so as to reflect the extending direction (second direction) of guide holes 14a which will be described later. A slope 14aa is formed on the surface side of the second engaging portion 14. The slope 14aa has an obtuse inclination angle with respect to the outer surface of the side wall 12. The inclination direction and inclination angle of the slope 14aa are also determined so as to reflect the extending direction (second direction) of the guide holes 14a which will be described later.

The third engaging portion 15 is located at the center of the side edge portion 12a, in other words, on the aforementioned center line of the side wall 12. The third engaging portion 15, which is formed integrally with the side wall 12 on the outer surface of the side wall 12, is formed like a truncated pyramid-shaped protrusion that extends at a constant height (length from the outer surface of the side wall 12) along the connecting portion 19. The third engaging portion 15 has an approximately trapezoidal cross section along the outer surface of the side wall 12. Further, the third engaging portion 15 has the same thickness from one end thereof on the same side as the first engaging portion 13 to the other end thereof on the same side to the second engaging portion 14, which is determined so as to reflect the extending direction (third direction) of a guide hole 15a which will be described later. A slope 15aa is formed on the surface side of the third engaging portion 15. The slope 15aa has an obtuse inclination angle with respect to the outer surface of the side wall 12. The inclination angle of the slope 15aa is also determined so as to reflect the extending direction (third direction) of the guide hole 15a which will be described later.

The first engaging portion 13 is located near one corner (left end in FIG. 5, right end in FIG. 6) of the side edge portion 12a of the side wall 12 and has two guide holes 13a formed to guide inserted nails 20 in the first direction. The guide holes 13a all extend in the first direction and penetrate from the slope 13aa located on the surface side of the first engaging portion 13 to a contact surface 13b located on the back side thereof. The slope 13aa located on the surface side of the first engaging portion 13 is a plane approximately perpendicular to the guide holes 13a extending in the first direction. This is to enable the worker to easily determine the insertion direction and push direction of nails 20 to be inserted into the guide holes 13a by knowing the direction of the slope 13aa.

Figure 7:
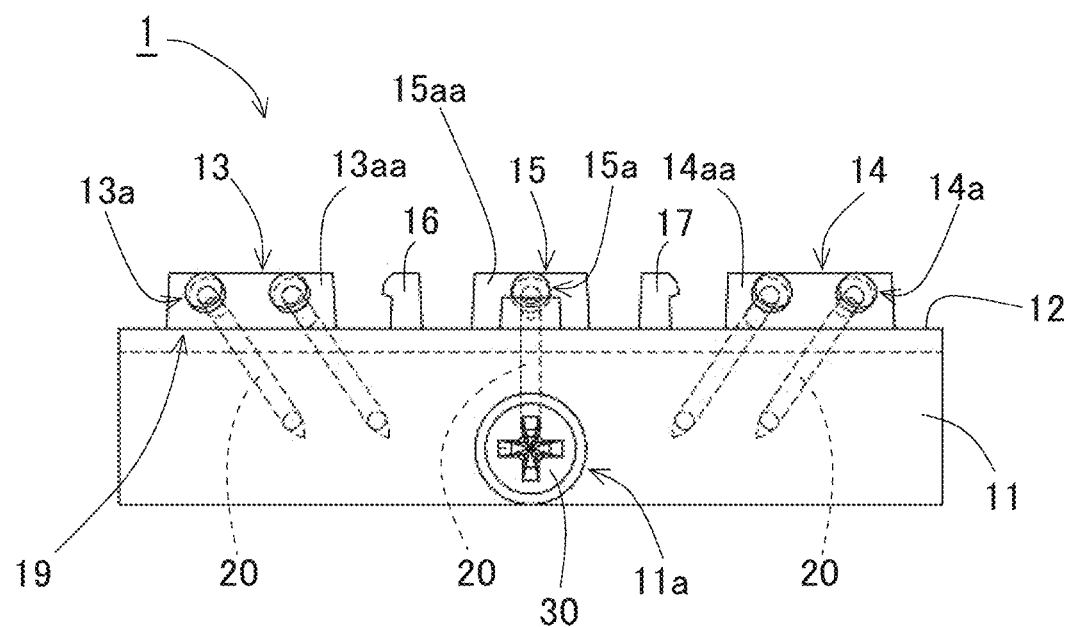
FIG. 7 is a front view showing the state in which the fixing device for an article attaching member shown in FIGS. 1 to 6 is used, in which nails are respectively inserted through guide holes of a first engaging portion, a second engaging portion, and a third engaging portion, and a wood screw is inserted through a through hole of an engagement wall.
Figure 8:
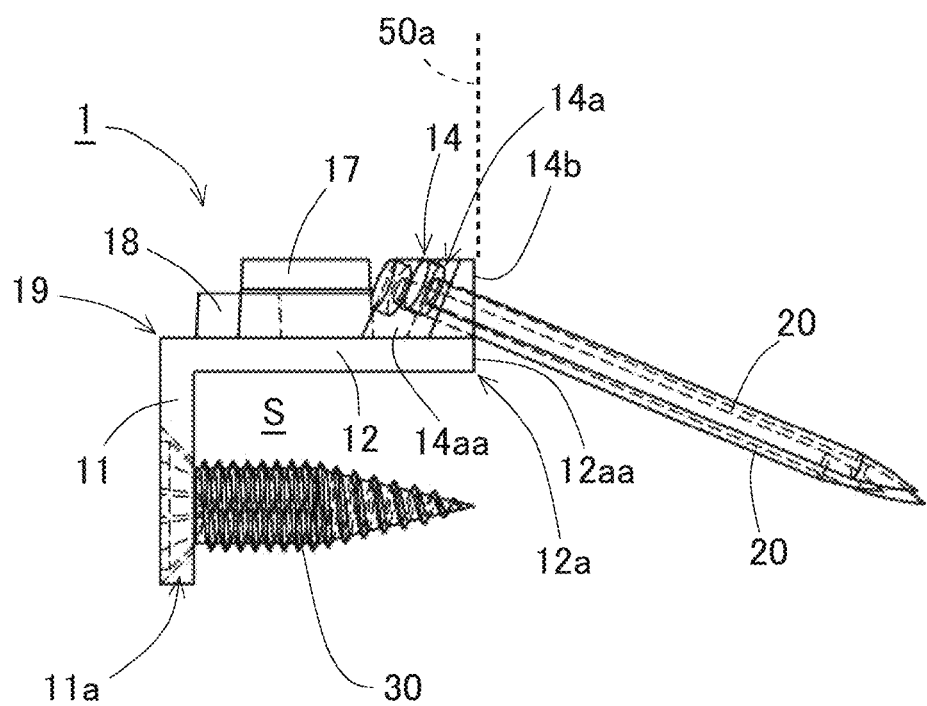
FIG. 8 is a right side view showing the state in which the fixing device for an article attaching member shown in FIGS. 1 to 6 is used, in which nails are respectively inserted through the guide holes of the first engaging portion, the second engaging portion, and the third engaging portion, and the wood screw is inserted through the through hole of the engagement wall.
Figure 9:
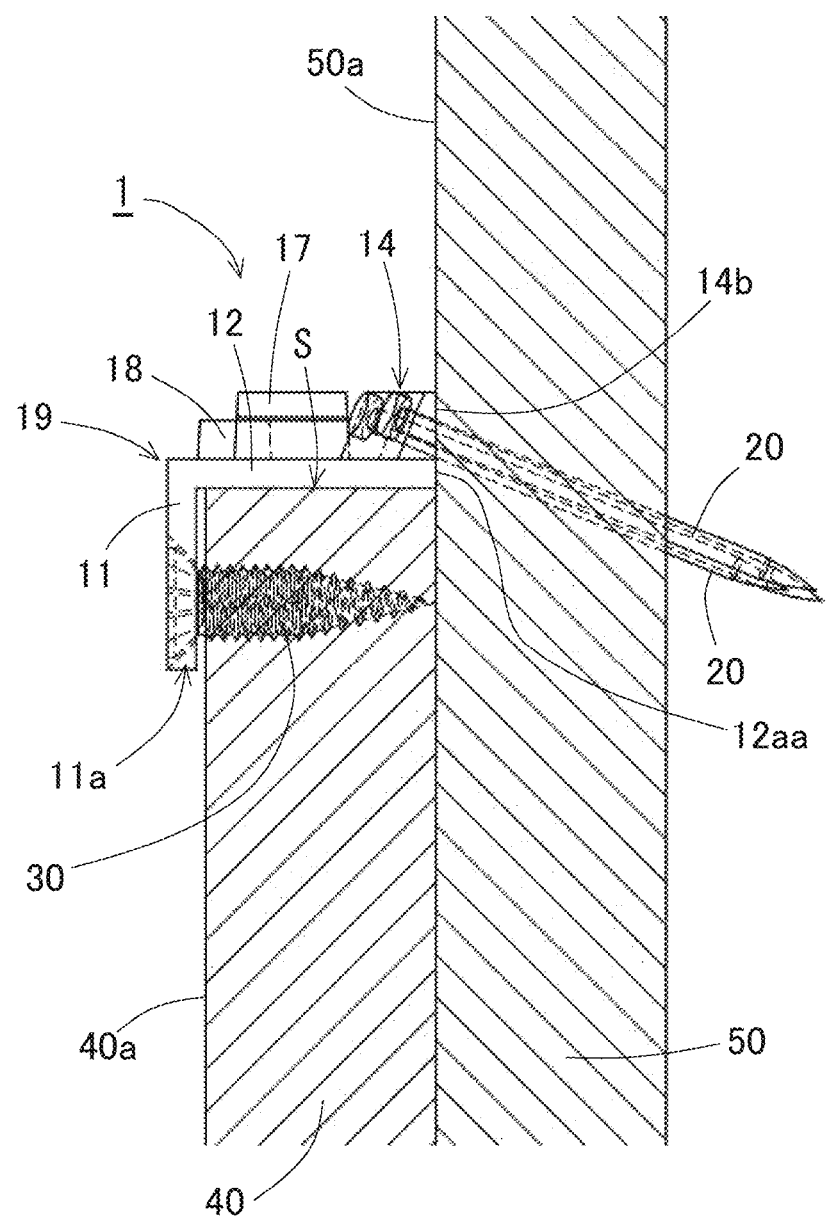
FIG. 9 is a right side view showing the state in which the fixing device for an article attaching member shown in FIGS. 1 to 6 is used; in which one corner portion (engaged portion) of a rectangular plate-shaped article attachment member is engaged with a space of the fixing device, the nails respectively inserted through the guide holes of the first engaging portion, the second engaging portion, and the third engaging portion are pushed into a wall surface made of gypsum board, and the wood screw inserted through the through hole of the engagement wall is screwed into the article attachment member.
Figure 10:
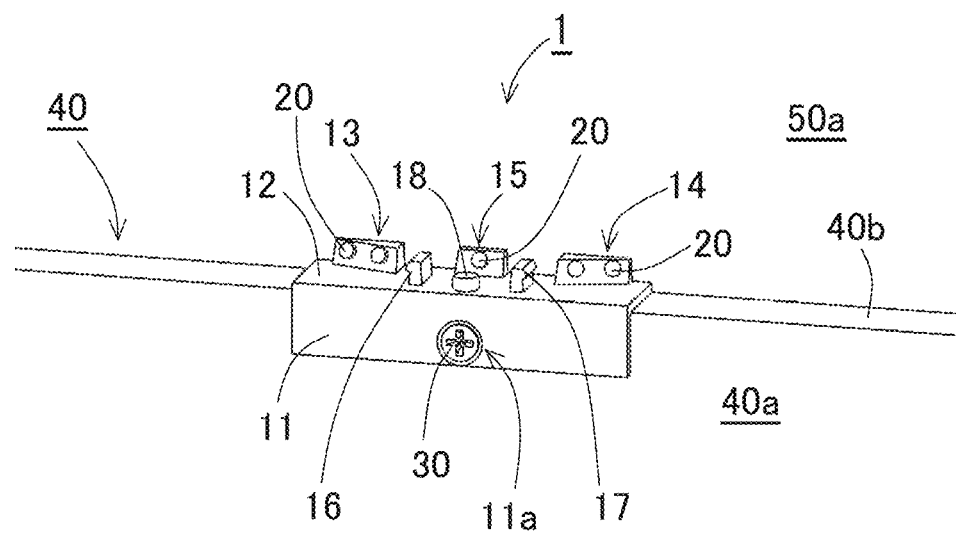
FIG. 10 is a perspective view showing the state in which the fixing device for an article attaching member shown in FIGS. 1 to 6 is used (this is also a fixing structure for an article attaching member according to an embodiment of the present invention), in which the rectangular plate-shaped article attaching member is fixed to the wall surface made of gypsum board by engaging the space of the fixing device with the engaged portion of the article attaching member.

The first direction, which is the direction in which the guide holes 13a extend and which is also the direction in which nails 20 are inserted, is set in the following way. Specifically, the first direction is inclined toward the inside of the side wall 12 (toward the space S) with respect to the aforementioned center line of the side wall 12 in a plane perpendicular to the outer surfaces of the engagement wall 11 and the side wall 12 (see FIG. 13), is inclined toward the center of the engagement wall 11 in a plane including the outer surface of the engagement wall 11 (see FIG. 12), and is inclined toward the center of the side wall 12 in a plane including the outer surface of the side wall 12. (See FIG. 14). Moreover, the first direction is a direction such that the tips of the nails 20, which are entirely inserted through the guide holes 13a of the first engaging portion 13, are located inside the side wall 12 (inside the space S). As a result, the nails 20 inserted through these guide holes 13a from the surface side of the fixing device 1 are pushed diagonally with respect to the side wall 12, as shown in FIGS. 7 to 9, and the tips of the nails 20 enter the inside of the side wall 12 (inside of the space S) and overlap with the space S. By setting the first direction in this way, it is difficult for the pushed nails 20 to fall off the wall surface 50a, and as a result, the mechanical strength when the fixing device 1 is fixed to the wall surface 50a can be increased.

The second engaging portion 14 is located near the other corner (right end in FIG. 5, left end in FIG. 6) of the side edge portion 12a of the side wall 12 and has two guide holes 14a formed to guide inserted nails 20 in the second direction. The guide holes 14a all extend in the second direction and penetrate from the slope 14aa located on the surface side of the second engaging portion 14 to a contact surface 14b located on the back side thereof. The slope 14aa located on the surface side of the second engaging portion 14 is a plane approximately perpendicular to the guide holes 14a extending in the second direction. This is to enable the worker to easily determine the insertion direction and push direction of nails 20 to be inserted into the guide holes 14a by knowing the direction of the slope 14aa.

The second direction, which is the direction in which the guide holes 14a extend and which is also the direction in which nails 20 are inserted, is set in the following way. Specifically, the second direction is inclined toward the inside of the side wall 12 (toward the space S) with respect to the aforementioned center line of the side wall 12 in a plane perpendicular to the outer surfaces of the engagement wall 11 and the side wall 12 (see FIG. 13), which is the same as the guide holes 13a of the first engaging portion 13. The second direction is inclined toward the center of the engagement wall 11 in a plane including the outer surface of the engagement wall 11 (see FIG. 12), which is opposite in inclination direction to the guide holes 13a of the first engaging portion 13. The second direction is inclined toward the center of the side wall 12 in a plane including the outer surface of the side wall 12. (See FIG. 14), which is opposite in inclination direction to the guide holes 13a of the first engaging portion 13. Moreover, the second direction is a direction such that the tips of the nails 20, which are entirely inserted through the guide holes 14a of the second engaging portion 14, are located inside the side wall 12 (inside the space S). As a result, the nails 20 inserted through these guide holes 14a from the surface side of the fixing device 1 are pushed diagonally with respect to the side wall 12 in an opposite direction to the guide holes 13a of the first engaging portion 13, as shown in FIGS. 7 to 9, and the tips of the nails 20 enter the inside of the side wall 12 (inside of the space S) and overlap with the space S. By setting the second direction in this way, it is difficult for the pushed nails 20 to fall off the wall surface 50a, and as a result, the mechanical strength when the fixing device 1 is fixed to the wall surface 50a can be increased.

As described above, since the second direction is symmetrical to the first direction with respect to the aforementioned center line of the side edge portion 12a, the nails 20 inserted through the guide holes 13a of the first engaging portion 13 are pushed into the wall surface 50a in the first direction, and at the same time, the nails 20 inserted through the guide holes 14a of the second engaging portion 14 are pushed into the wall surface 50a in the second direction which is symmetrical to the first direction. Therefore, the fixing device 1 according to the present embodiment is supported by the nails 20 which are pushed into the wall surface 50a so as to sandwich the wall surface 50a from two different sides via the first engaging portion 13 and the second engaging portion 14. Accordingly, the fixing device 1 can be fixed to the wall surface 50a with sufficiently high mechanical strength.

The third engaging portion 15 is located at the center of the side edge portion 12a of the side wall 12, in other words, on the aforementioned center line of the side edge portion 12a and has one guide hole 15a which is formed to guide an inserted nail 20 in the third direction. The guide hole 15a extends in the third direction and penetrates from the slope 15aa located on the surface side of the third engaging portion 15 to a contact surface 15b located on the back side thereof. The slope 15aa located on the surface side of the third engaging portion 15 is a plane approximately perpendicular to the guide hole 15a extending in the third direction. This is to enable the worker to easily determine the insertion direction and push direction of a nail 20 to be inserted into the guide hole 15a by knowing the direction of the slope 15aa.

The third direction, which is the direction in which the guide hole 15a extends and which is also the direction in which a nail 20 is inserted, is set in the following way. Specifically, the third direction is inclined toward the inside of the side wall 12 (towards the space S) with respect to the aforementioned center line of the side wall 12 in a plane perpendicular to the outer surfaces of the engagement wall 11 and the side wall 12. (See FIG. 13), which is the same as the guide holes 13a of the first engaging portion 13 and the guide holes 14a of the second engaging portion 14. The third direction is not inclined in a plane including the outer surface of the engagement wall 11 (see FIG. 12) and is not inclined in a plane including the outer surface of the side wall 12 also (see FIG. 14). That is, the third direction is within a plane perpendicular to the outer surfaces of the engagement wall 11 and the side wall 12. Moreover, the third direction is a direction such that the tip of the nail 20, which is entirely inserted through the guide hole 15a of the third engaging portion 15, is located inside the side wall 12 (inside the space S). As a result, the nail 20 inserted through the guide hole 15a from the surface side of the fixing device 1 is pushed diagonally with respect to the side wall 12 in a plane perpendicular to the outer surfaces of the engagement wall 11 and the side wall 12, as shown in FIGS. 7 to 9, and the tip of the nail 20 enters the inside of the side wall 12 (inside of the space S) and overlaps with the space S. By setting the third direction in this way, it is difficult for the pushed nail 20 to fall off the wall surface 50a, and as a result, the mechanical strength when the fixing device 1 is fixed to the wall surface 50a can be increased.

As described above, the third direction is inclined toward the inside of the side wall 12 (towards the space S) with respect to the aforementioned center line of the side wall 12 in a plane perpendicular to the outer surfaces of the engagement wall 11 and the side wall 12. Thus, the nails 20 inserted through the guide holes 13*a* of the first engaging portion 13 are pushed into the wall surface 50*a* in the first direction and at the same time, the nails 20 inserted through the guide holes 14*a* of the second engaging portion 14 are pushed into the wall surface 50*a* in the second direction which is symmetrical to the first direction, and further in addition, the nail 20 inserted through the guide hole 15*a* of the third engaging portion 15 is inclined toward the inside of the side wall 12 (towards the space S) in a plane perpendicular to the outer surfaces of the engagement wall 11 and the side wall 12. Therefore, the fixing device 1 according to the present embodiment is supported via the first, second, and third engaging portions 13, 14, and 15 not only by the nails 20 which are pushed into the wall surface 50*a* in the first and second directions so as to sandwich the wall surface 50*a* from two different sides but also by the nail 20 which is pushed into in the third direction different from the first and second directions. Accordingly, the mechanical strength when the fixing device 1 is fixed to the wall surface 50*a* can be further increased compared with the case where the fixing device 1 is supported by the nails 20 pushed in the first and second directions.

The contact surface 13*b* formed on the back side of the first engaging portion 13, the contact surface 14*b* formed on the back side of the second engaging portion 14, and the contact surface 15*b* formed on the back side of the third engaging portion 15 are all flush with the end of the side edge portion 12*a*, in other words, the contact surface 12*aa* of the side edge portion 12*a*. This is to ensure that when the fixing device 1 according to the present embodiment is fixed, the contact surface 12*a* of the side wall 12 and the contact surfaces 13*b*, 14*b*, and 15*b* formed on the outside of the side wall 12 are closely contacted with the wall surface 50*a* simultaneously.

Since the slopes 13*a*, 14*a*, and 15*a* of the first, second, and third engaging portions 13, 14, and 15 are formed as described above, the nails 20 are pushed in diagonally inward with respect to the side wall 12. Thus, the head of each nail 20 inserted through a corresponding one of the guide holes 13*a*, 14*a*, or 15*a* is always located at a position slightly apart from the side wall 12 toward the outside, so that the side wall 12 does not become a hindrance. Accordingly, there is an advantage that the work of inserting the nail 20 and the work of pushing (driving) the nails 20 are easy.

A pair of rectangular rod-shaped protrusions 16 and 17 and a round rod-shaped protrusion 18 are further formed on the outer surface of the side wall 12. These protrusions 16, 17, and 18 are all prepared for engaging a decorative cap member (not shown) that covers the surface of the fixing device 1 after an article attaching member 40 is fixed to the wall surface 50*a* made of gypsum board 50 using the fixing device 1. Since the fixing device 1 is exposed to the side of the surface 40*a* of the article attaching member 40 when the device 1 is fixed to the wall surface 50*a* using the nails 20, there is a risk of giving a bad impression to viewers (users, etc.). Taking this fact into consideration, the decorative cap member is added to improve the appearance of the fixing device 1 after fixing. However, the decorative cap member has little relation to the present invention and thus, the explanation about it will be omitted here. It should be noted that these protrusions 16, 17, and 18 for engagement are not essential to the function of the fixing device 1 and thus, they can be omitted.

(Configuration of Article Attaching Member)

Figure 11:
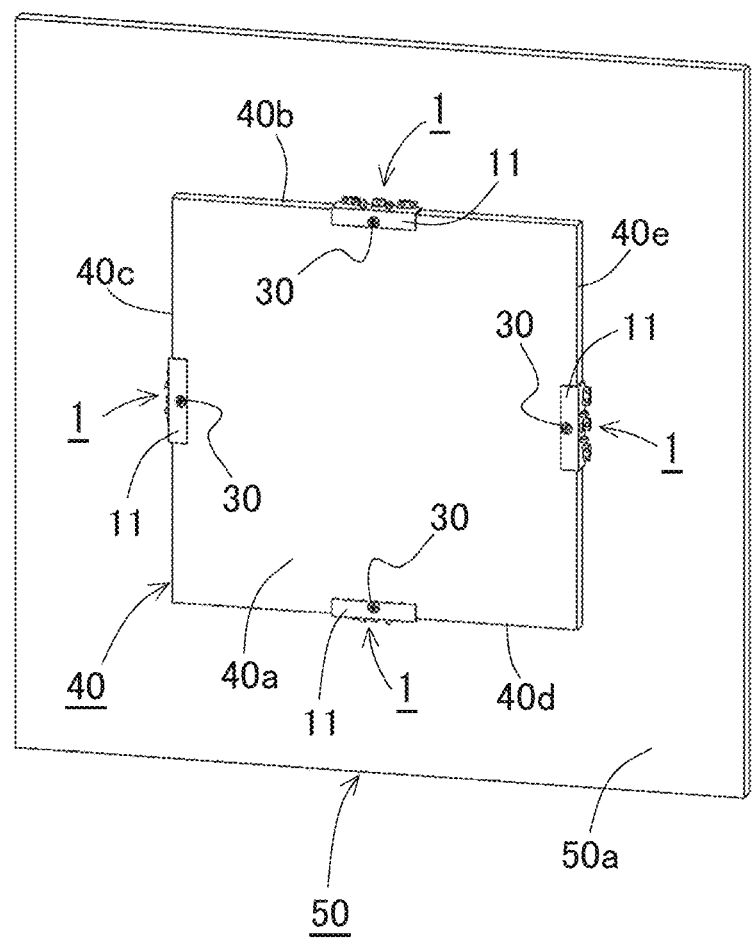
FIG. 11 is a perspective view showing the state in which the fixing device for an article attaching member shown in FIGS. 1 to 6 is used (this is also the fixing structure for an article attaching member according to the embodiment of the present invention), in which the rectangular plate-shaped article attaching member is fixed to the wall surface made of gypsum board by respectively engaging the spaces of the four fixing devices with the four engaged portions of the article attaching member.
Figure 25:
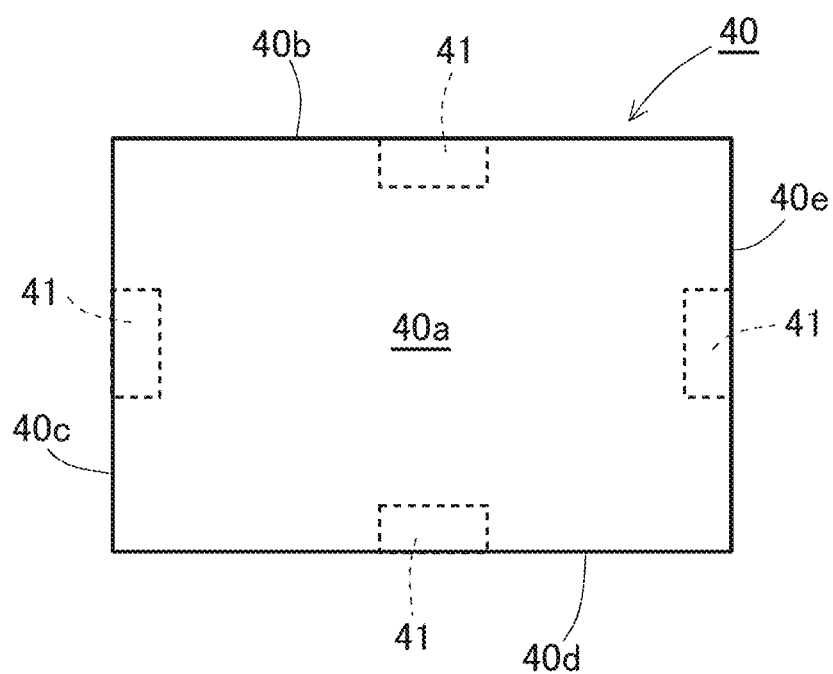
FIG. 25 is a plan view showing the article attaching member to be fixed by the fixing device for an article attaching member shown in FIGS. 1 to 6.

FIG. 25 shows an example of the article attaching member 40 to be fixed to the wall surface 50*a* by the fixing device 1 according to the present embodiment having the above-described configuration. As can be seen from this figure, the article attaching member 40 is rectangular plate-shaped in the present embodiment. The rectangular flat surface 40*a* of the member 40 is a surface to be exposed indoors etc. and to which various articles (articles to be attached) are to be attached. The rectangular flat back surface of the member 40, which is located on the opposite side to the surface 40*a*, is a surface to be faced on and to be contacted with the wall surface 50*a*. The member 40 has four side faces around the surface 40*a*, namely, an upper side face 40*b*, a left side face 40*c*, a lower side face 40*d*, and a right side face 40*e*. Each of the four central portions of the member 40 serves as an engaged portion 41 to be engaged with the fixing device 1. As shown in FIG. 11, the member 40 is fixed to the wall surface 50*a* by four of the fixing devices 1 while the entire back surface of the member 40 is faced on and contacted with the wall surface 50*a*.

Figure 26A:
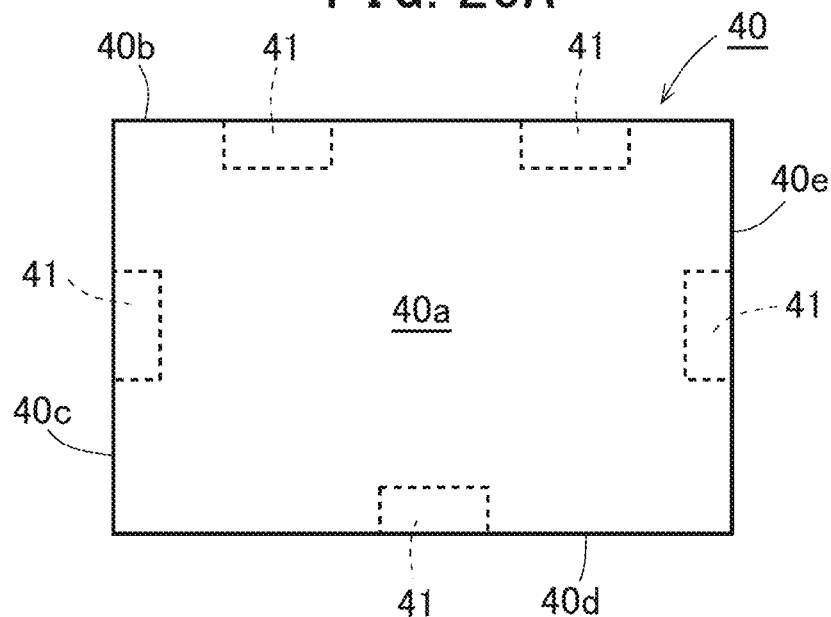
FIG. 26A is a plan view showing another example of arrangement of the fixing devices for an article attaching member shown in FIGS. 1 to 6 when fixing the article attaching member by the fixing devices, in which the rectangular plate-shaped article attaching member is fixed using five of the fixing devices in total.
Figure 26B:
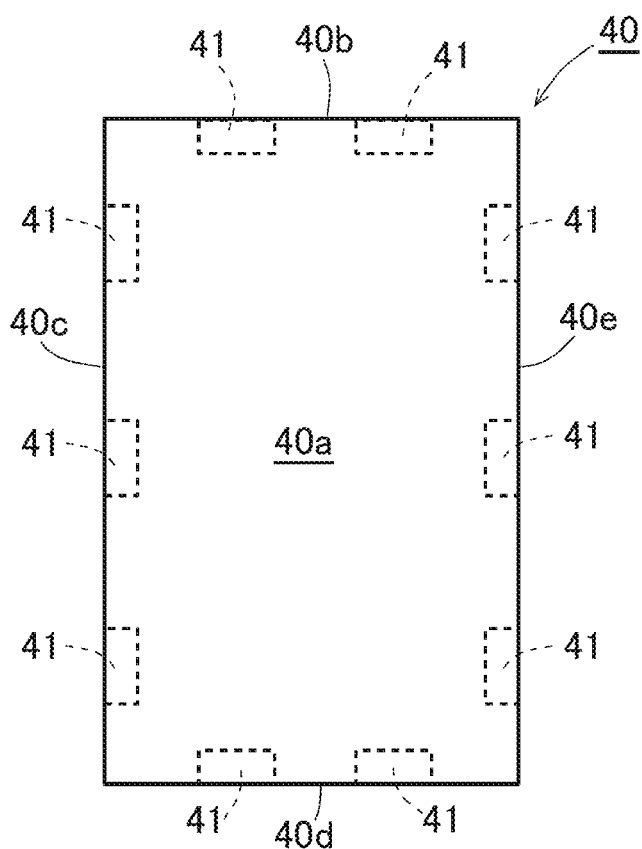
FIG. 26B is a plan view showing still another example of arrangement of the fixing devices for an article attaching member shown in FIGS. 1 to 6 when fixing the article attaching member by the fixing devices, in which the rectangular plate-shaped article attaching member is fixed using ten of the fixing devices in total.

Other examples of arrangement of the fixing devices 1 according to the present embodiment when fixing the rectangular plate-shaped article attaching member 40 to the wall face 50*a* by the fixing devices 1 are shown in FIGS. 26A and 26B.

The example shown in FIG. 26A is an arrangement where two engaged portions 41 are provided on the upper side face 40*b* to which the largest force is applied among the four side faces 40*b*, 40*c*, 40*d*, and 40*e* of the article attaching member 40 shown in FIG. 25, and the two fixing devices 1 in total are intended to be arranged on the two engaged portions 41, respectively. One engaged portion 41 is provided on each of the left side face 40*c*, the lower side face 40*d*, and the right side face 40*e* to which the applied force is not so large, and the fixing device 1 is intended to be arranged on each of these engaged portions 41. In this way, with the fixing device 1 according to the present embodiment, even if the article attaching member 40 has the same shape, the number (total number) and arrangement (layout) of the fixing devices 1 used for fixing the member 40 can be arbitrarily adjusted depending on the usage situation (application) and the installation location of the member 40.

The example shown in FIG. 26B is another arrangement where a total of the ten engaged portions 41 are provided on the four side surfaces 40*b*, 40*c*, 40*d*, and 40*e* of the article attaching member 40 shown in FIG. 25, and the fixing device 1 is intended to be arranged to each of the ten engaged portions 41. The article attaching member 40 shown in FIG. 26B has a vertically long rectangular overall shape. Considering this shape, two engaged portions 41 are provided on each of the upper side face 40*b* and the lower side face 40*d* which are relatively short, and three engaged portions 41 are provided on each of the left side face 40*c* and the right side face 40*e* which are relatively long. The fixing device 1 is intended to be arranged on each of these engaged portions 41. In this way, with the fixing device 1 according to the present embodiment, the number (total number) and arrangement (layout) of the fixing devices 1 used for fixing the member 40 can be arbitrarily adjusted depending on the shape of the member 40 itself.

(Usage Form of Fixing Device for Article Attaching Member)

Next, a usage form of the fixing device 1 for an article attaching member according to the embodiment of the present invention having the above-described configuration will be described.

As a premise for explaining the usage form of the fixing device 1 according to the present embodiment, it is assumed that the gypsum board 50 is fixed in a vertical direction as an inner wall of a house, an office building, etc., as shown in FIG. 9, and thus, the wall surface 50a made of the gypsum board 50 is formed in a vertical direction. Moreover, a case in which the rectangular plate-shaped article attaching member 40 (see FIGS. 11 and 25) is fixed to a desired location on the vertical wall surface 50a using the four fixing devices 1 in total will be considered.

As described above, the shape and size of the space S of the fixing device 1 according to the present embodiment are adjusted such that one of the engaged portions 41 (which has a quadrangular prism shape with a rectangular cross section) of the article attaching member 40 is inserted by way of the opening formed on the opposite side to the engagement wall 11 (the back surface side of the fixing device 1), and such that the engaged portion 41 is engaged with and held by the engaging wall 11 and the side wall 12.

First, the rectangular plate-shaped article attaching member 40 is temporarily pressed against a desired installation location on the vertical wall surface 50a made of the gypsum board 50 and then, L-shaped marks are formed at the respective positions (4 locations) where the engaged portions 41 of the member 40 are arranged with a pencil, etc. In this way, the four engaged portions 41 of the member 40 are positioned on the wall surface 50a.

Next, after separating the article attaching member 40 from the wall surface 50a, the spaces S of the first to fourth fixing devices 1 are respectively inserted into and engaged with the four engaged portions 41 of the member 40. At this time, while the side face (for example, the upper side face 40b) on which the engaged portion 41 of the member 40 is moved to contact with the inner surfaces of the engagement wall 11 and the side wall 12 of the corresponding fixing device 1, respectively, the said engaged portion 41 is pushed into the space S of the said fixing device 1 through the opening formed on the opposite side to the engagement wall 11 of the said fixing device 1.

Then, while maintaining the aforementioned engaged state, a wood screw 30 is screwed into the through hole 11a, which is formed in the engagement wall 11 of each fixing device 1, from the outside of the said engagement wall 11, thereby fixing the first to fourth fixing devices 1 to the corresponding engaged portions 41 of the article attaching member 40, respectively. At this time, since the tip of each wood screw 30 enters the inside of the corresponding article attaching member 40, the four fixing devices 1 are respectively fixed to the four corresponding engaged portions 41 of the member 40. In this state, each engaged portion 41 is engaged not only with the engagement wall 11 of the corresponding fixing device 1 but also with the side wall 12 thereof. Therefore, the strength and stability for fixing each engaged portion 41 to the wall surface 50a are increased compared with the case where each engaged portion 41 is engaged with only the engagement wall 11, which is preferable.

Subsequently, while referring to the four L-shaped marks formed on the wall surface 50a earlier, the position and attitude of the article attaching member 40 to which the four fixing devices 1 have been respectively fixed to the four corresponding engaged portions 41 are adjusted. In this way, the article attaching member 40 is pressed against the desired installation location on the wall surface 50a.

Thereafter, for example, regarding the first fixing device 1 disposed on the engaged portion 41 which is provided on the upper side face 40b of the article attaching member 40, a first nail 20 is inserted into any one of the two guide holes 13a of the first engaging portion 13, the two guide holes 14a of the second engaging portion 14, and the single guide hole 15a of the third engaging portion 15 of the said fixing device 1 until the tip of the said nail 20 reaches the wall surface 50a. Then, the head of the said nail 20 is hit with an appropriate tool (for example, a small hammer, a special jig, etc.), thereby temporarily pushing (driving) the said nail 20 into the wall surface 50a.

Thereafter, in the same manner as described above, second to fifth nails 20 are respectively inserted into the remaining four guide holes 13a, 14a, and 15a of the first, second, and third engaging portions 13, 14, and 15 of the first fixing device 1 until the tips of the second to fifth nails 20 reach the wall surface 50a. Then, the heads of the said nails 20 are hit with the aforementioned tool, thereby temporarily pushing (driving) the second to fifth nails 20 into the wall surface 50a.

Finally, the first to fifth nails 20 for the first fixing device 1 are further hit with the aforementioned tool, thereby pushing (driving) these nails 20 until their heads come into close contact with the corresponding slopes 13aa, 14aa, and 15aa of the first, second, and third engaging portions 13, 14, and 15. As a result, the first, second, and third engaging portions 13, 14, and 15 of the first fixing device 1 are engaged with the wall surface 50a by the first to fifth nails 20 thus pushed (driven) and therefore, the first fixing device 1 itself is also fixed to the wall surface 50a. In this way, the fixation of the first fixing device 1 to the wall surface 50a is completed.

By going through the above steps, the tips of the first to fifth nails 20 for the first fixing device 1 penetrate through the wall surface 50a and deeply enter the inside of the gypsum board 50. At this time, the two nails 20 in total which are guided by the guide holes 13a of the first engaging portion 13 enter the inside of the gypsum board 50 in the first direction. Moreover, the two nails 20 in total which are guided by the guide holes 14a of the second engaging portion 14 enter the inside of the gypsum board 50 in the second direction. Further, the single nail 20 which is guided by the guide hole 15a of the third engaging portion 15 enters the inside of the gypsum board 50 in the third direction.

Here, as described above, the first direction is a direction that is inclined toward the inside of the side wall 12 and is inclined toward the central portion (third engaging portion 15) of the side edge portion 12a along the outer surface of the side wall 12, and that the tips of the nails 20 inserted through the guide holes 13a of the first engaging portion 13 are located inside the side wall 12. Therefore, the two nails 20 in total which are inserted through these guide holes 13a from the surface side of the first fixing device 1 are pushed diagonally into the side wall 13, as shown in FIGS. 7 to 9 and as a result, the tips of these nails 20 enter the inside of the side wall 13 and overlap with the space S.

Moreover, as described above, the second direction is a direction that is symmetrical to the first direction with respect to the center line of the side edge portion 12a (a straight line passing through the center of the side edge portion 12a and parallel to the two short sides of the side wall 12). Therefore, the two nails 20 in total which are inserted through the guide holes 14a from the surface side of the first fixing device 1 are pushed diagonally in the direction opposite to that of the nails 20 inserted through the guide holes 13a, and the tips of the said nails 20 enter the inside of the side wall 13 and overlap with the space S. This means that the first fixing device 1 is supported by the four nails 20 in total which are pushed into the inside of the wall surface 50*a* so as to sandwich it from two sides via the first and second engaging portions 13 and 14.

Furthermore, as described above, the third direction is a direction that is inclined toward the inside of the side wall 12 and is inclined in a direction perpendicular to the connecting portion 19 along the outer surface of the side wall 12, and that the tip of the nail 20 entirely inserted through the guide hole 15*a* of the third engaging portion 15 is located in the inside of the side wall 12. Therefore, the nail 20 which is inserted through the guide hole 15*a* from the surface side of the fixing device 1 is pushed diagonally with respect to the side wall 13, as shown in FIGS. 7 to 9, and the tip of the said nail 20 enters the inside of the side wall 13 and overlap with the space S. As a result, the first fixing device 1 is supported by the nail 20 also which is pushed in the third direction different from the first and second directions, in addition to the nails 20 pushed in the first and second directions.

Accordingly, the said engaged portion 41 of the article attaching member 40 can be held on the wall surface 50*a* by the first fixing device 1 with sufficiently high strength. Furthermore, this strength can be made high enough to hold not only the weight of the article attachment member 40 but also the weight of various articles (for example, rod-shaped hangers, pole-shaped hooks, etc.) that will be later attached to the surface 40*a* of the member 40.

For example, strength that exceeds the withstand load (the limit of allowable weight) of the article attachment member 40 can be easily realized by adjusting the total number of the nails 20 used for the first fixing device 1, the strength of each nail 20 (for example, diameter, total length, material, etc.), or both of them, and/or by adjusting the rigidity, impact resistance, durability, etc. of the said fixing device 1 itself depending on the withstand load (limit allowable weight) to be set for the article attachment member 40.

Next, the second fixing device 1 is also fixed to the wall surface 50*a* in the same manner as described above. Specifically, at this stage, one of the engaged portions 41 of the article attaching member 40 has been fixed to the wall surface 50*a* by the first fixing device 1 and thus, the member 40 is in the state where it is held on the wall surface 50*a* only by the first fixing device 1. Therefore, the second fixing device 1 may be fixed in sequence using first to fifth nails 20 in the same manner as described above.

For example, regarding the second fixing device 1 disposed on the engaged portion 41 which is provided on the right side face 40*e* of the article attaching member 40, a first nail 20 is inserted into any one of the two guide holes 13*a* of the first engaging portion 13, the two guide holes 14*a* of the second engaging portion 14, and the single guide hole 15*a* of the third engaging portion 15 of the said fixing device 1 until the tip of the said nail 20 reaches the wall surface 50*a*. Then, the head of the said nail 20 is hit with an appropriate tool (for example, a small hammer, a special jig, etc.), thereby temporarily pushing (driving) the said nail 20 into the wall surface 50*a*.

Thereafter, in the same manner as described above, second to fifth nails 20 are respectively inserted into the remaining four guide holes 13*a*, 14*a*, and 15*a* of the first, second, and third engaging portions 13, 14, and 15 of the second fixing device 1 until the tips of the second to fifth nails 20 reach the wall surface 50*a*. Then, the heads of the said nails 20 are hit with the aforementioned tool, thereby temporarily pushing (driving) the second to fifth nails 20 into the wall surface 50*a*.

Finally, the first to fifth nails 20 for the second fixing device 1 are further hit with the aforementioned tool, thereby pushing (driving) these nails 20 until their heads come into close contact with the corresponding slopes 13*aa*, 14*aa*, and 15*aa* of the first, second, and third engaging portions 13, 14, and 15. As a result, the first, second, and third engaging portions 13, 14, and 15 of the second fixing device 1 are engaged with the wall surface 50*a* by the first to fifth nails 20 thus pushed (driven) and therefore, the second fixing device 1 itself is also fixed to the wall surface 50*a*. In this way, the fixation of the second fixing device 1 to the wall surface 50*a* is completed.

Furthermore, for example, regarding the third fixing device 1 disposed on the engaged portion 41 which is provided on the left side face 40*c* of the article attaching member 40, in the same manner as described above, first to fifth nails 20 are respectively pushed (driven) until their heads come into close contact with the corresponding slopes 13*aa*, 14*aa*, and 15*aa* of the first, second, and third engaging portions 13, 14, and 15. As a result, the first, second, and third engaging portions 13, 14, and 15 of the third fixing device 1 are engaged with the wall surface 50*a* by the first to fifth nails 20 thus pushed (driven) and therefore, the third fixing device 1 itself is also fixed to the wall surface 50*a*. In this way, the fixation of the third fixing device 1 to the wall surface 50*a* is completed.

Finally, for example, regarding the fourth fixing device 1 disposed on the engaged portion 41 which is provided on the lower side face 40*d* of the article attaching member 40, first to fifth nails 20 are pushed (driven) in the same manner as described above. As a result, the first, second, and third engaging portions 13, 14, and 15 of the fourth fixing device 1 are engaged with the wall surface 50*a* by the first to fifth nails 20 thus pushed (driven) and therefore, the fourth fixing device 1 itself is also fixed to the wall surface 50*a*. In this way, the fixation of the fourth fixing device 1 to the wall surface 50*a* is completed.

When the work of fixing the first to fourth fixing devices 1 to the wall surface 50*a* using the twenty nails 20 in total is completed in the manner described above, the article attaching member 40 is fixed to the wall surface 50*a* in such the state as shown in FIG. 11 by the first to fourth fixing devices 1 which are respectively arranged at the four engaged portions 41 of the member 40. In this state, the four engaged portions 41 of the member 40 are held on the wall surface 50*a* with sufficient strength by the first to fourth fixing devices 1. Moreover, this strength is sufficient to hold the total weight obtained by adding the weight of various articles (for example, rod-shaped hangers, pole-shaped hooks, etc.) that will be later attached to the surface 40*a* of the member 40 to the weight of the member 40 itself.

It should be noted that the structure shown in FIG. 11 in which the article attaching member 40 is fixed to the wall surface 50*a* by the four fixing devices 1 shows a fixing structure for an article attaching member according to an embodiment of the present invention.

Figure 15:
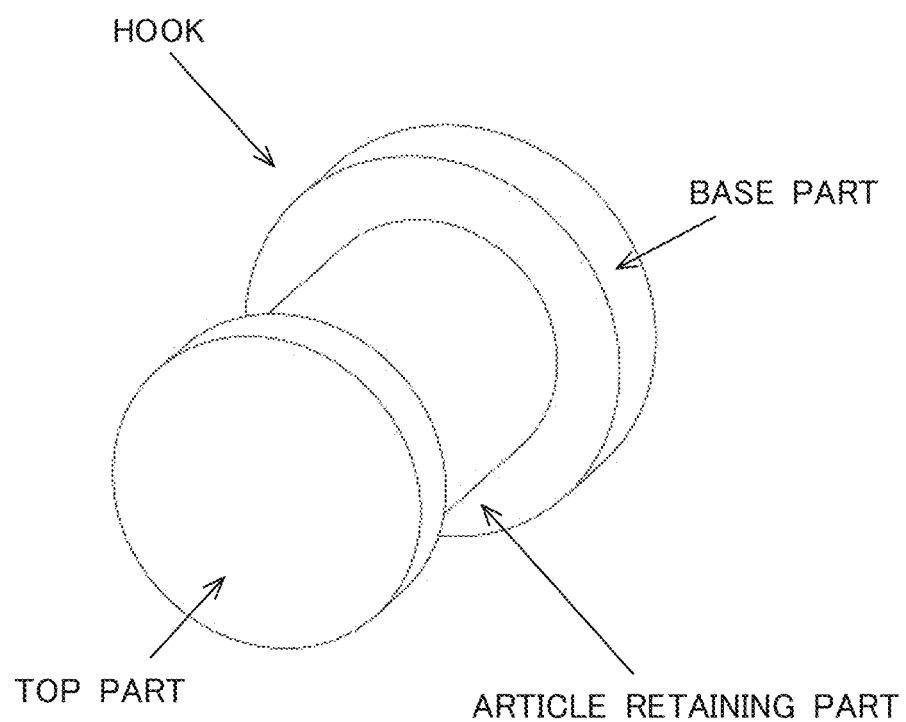
FIG. 15 is a perspective view of a pole-shaped hook (article to be attached) attached to the article attaching member, which was used in the efficacy confirmation test.

In the state of FIG. 11, the rectangular plate-shaped article attaching member 40 is fixed to the wall surface 50*a* by the first to fourth fixing devices 1 which are arranged at the four engaged portions 41 of the member 40. To the surface 40*a* of the member 40 fixed in this way, for example, a desired article, e.g., a pole-shaped hook shown in FIGS. 15 and 16 is attached. In this case, first, a fixing member (see FIGS. 17A, 17B, 18A, and 18B) is fixed to the article attaching member 40 using tapping screws etc. and then, a pole-shaped hook is attached to the fixing member thus fixed. It should be noted that the article attaching member 40 may be formed such that a plurality of articles may be attached to the member 40 at the same time by, for example, enlarging the size of the member 40 according to the necessity.

Figure 16A:
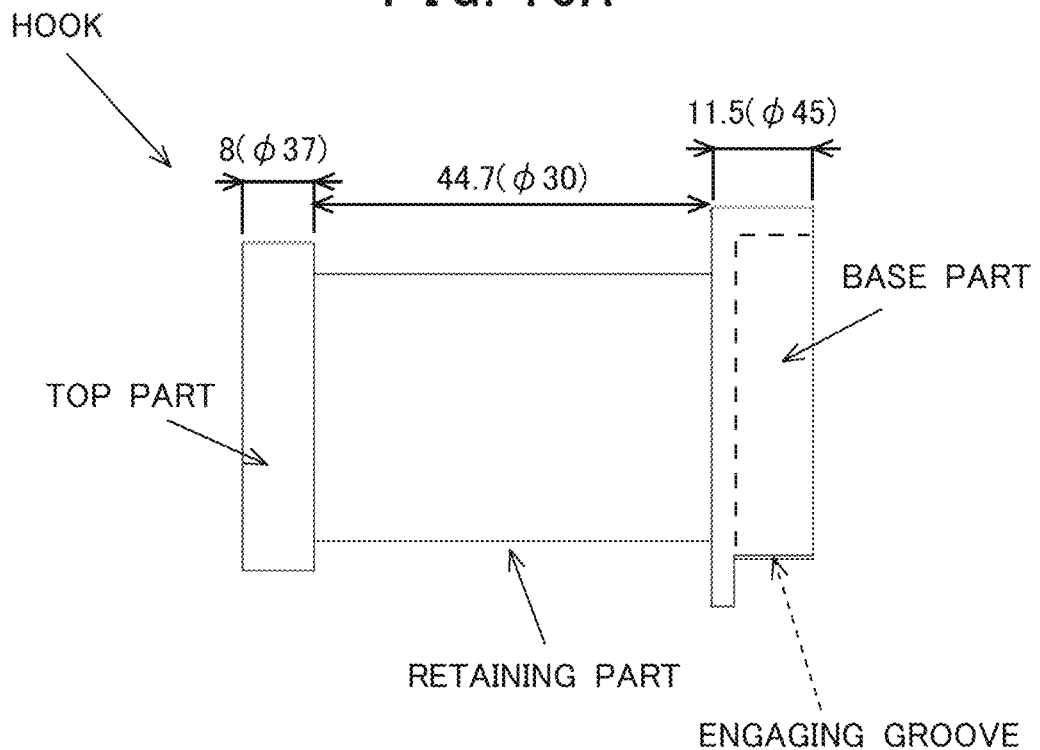
FIG. 16A is a right side view showing the dimensions of the pole-shaped hook (article to be attached) attached to the article attaching member, which was used in the efficacy confirmation test.
Figure 16B:
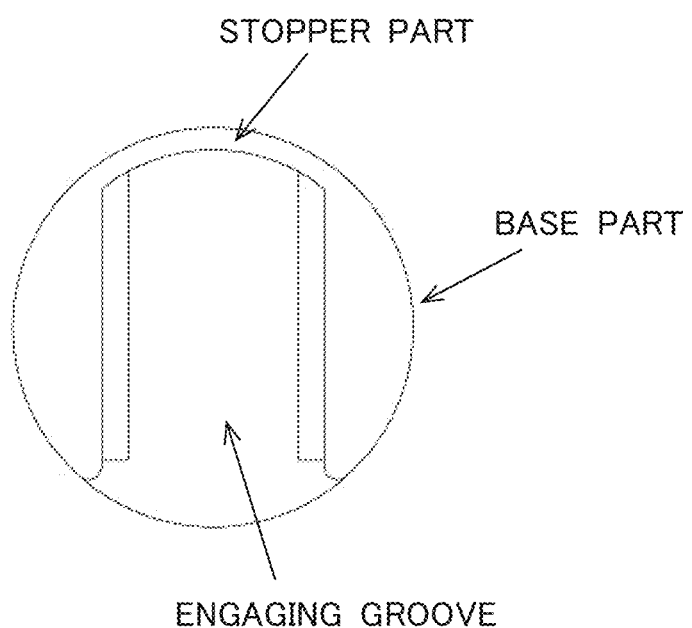
FIG. 16B is a rear view showing the dimensions of the pole-shaped hook (article to be attached) attached to the article attaching member, which was used in the efficacy confirmation test.

The article or articles to be attached to the article attaching member 40 (attached article or articles) is/are not limited to the pole-shaped hook shown in FIGS. 15m 16A, and 16B. It goes without saying that any other articles (for example, shelves, hooks, handrails, towel racks, clocks, racks, etc.) can be attached to the member 40. Furthermore, the fixing member for the article to be attached is not limited to that shown in FIGS. 17A, 17B, 18A, and 18B and it goes without saying that any other fixing member or members can be used for this purpose.

Furthermore, it is difficult to attach articles using screws or nails to the wall surface 50a made of the gypsum board 50; however, in the present embodiment, the article attaching member 40, which is made of wood, is fixed to the wall surface 50a using the four fixing devices 1. Therefore, there is no need to use products which are devised to enable fixation of articles such as hooks and hangers to a wall surface made of gypsum board without using the "gypsum board anchor", such as the article attaching device of Patent Literature 1 and the article fixing structure of Patent Literature 2 which have been described previously. It is very convenient that many articles that can be attached to a wall surface made of wood or the like using screws or nails can be directly attached to the wall surface 50a made of the gypsum board (specifically, the surface 40a of the article attaching member 40).

(Efficacy Confirmation Test)

The inventors of the present invention actually produced the fixing device 1 for an article attaching member according to the embodiment of the present invention having the aforementioned configuration and then, conducted a test (efficacy confirmation test) to confirm its fixing strength. In this test, the fixing strength of the fixing device 1 was measured at room temperature (approximately 20° C.) using a precision universal testing machine AG-X 50 kN manufactured by Shimadzu Corporation. In addition, a similar test was conducted for a comparative example (described later) also. The test procedures were as follows.

(Test of Fixing Device 1 According to Embodiment of the Present Invention)

Figure 12:
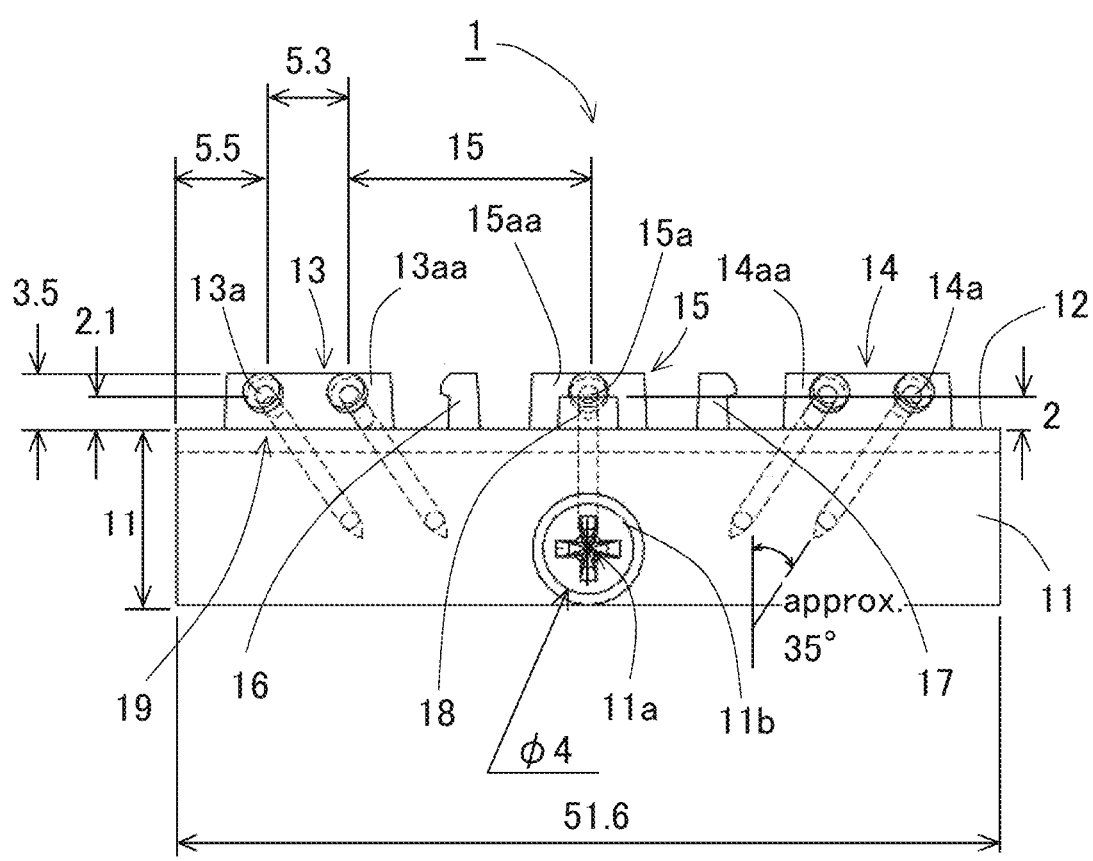
FIG. 12 is a front view showing the dimensions of the fixing device for an article attaching member shown in FIGS. 1 to 6, which was used in an efficacy confirmation test.
Figure 13:
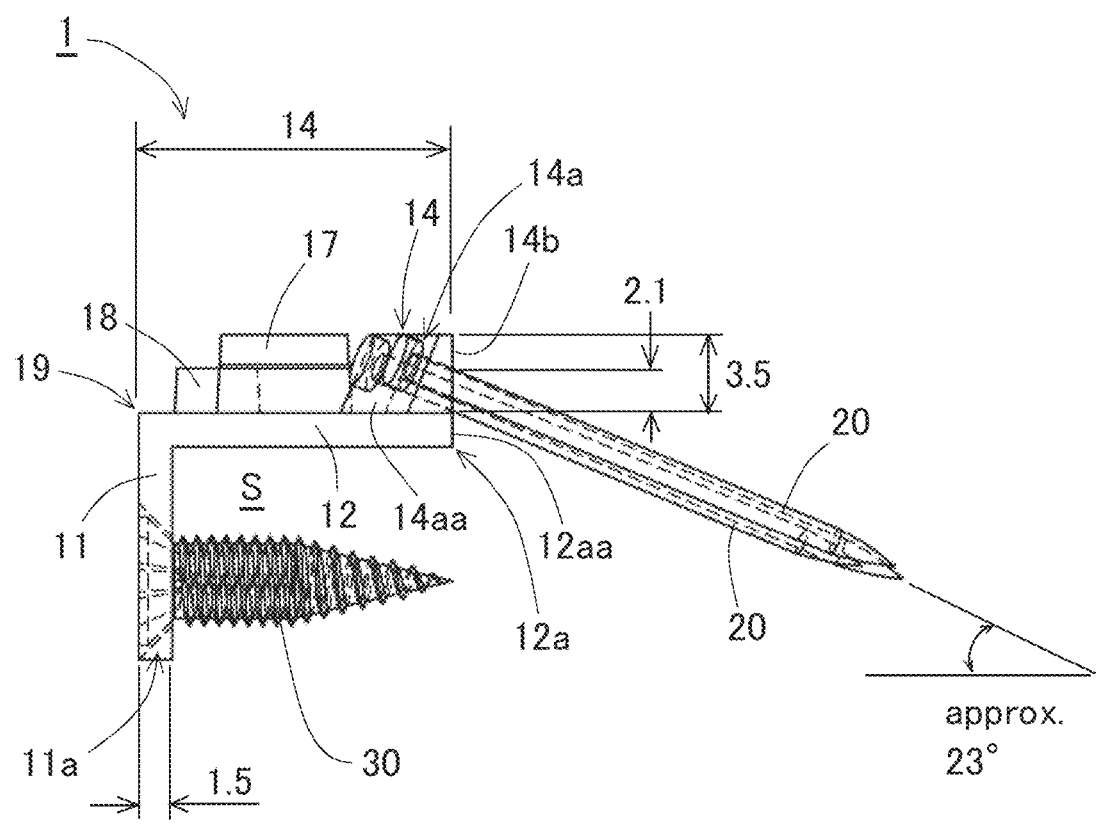
FIG. 13 is a right side view showing the dimensions of the fixing device for an article attaching member shown in FIGS. 1 to 6, which was used in the efficacy confirmation test.
Figure 14:
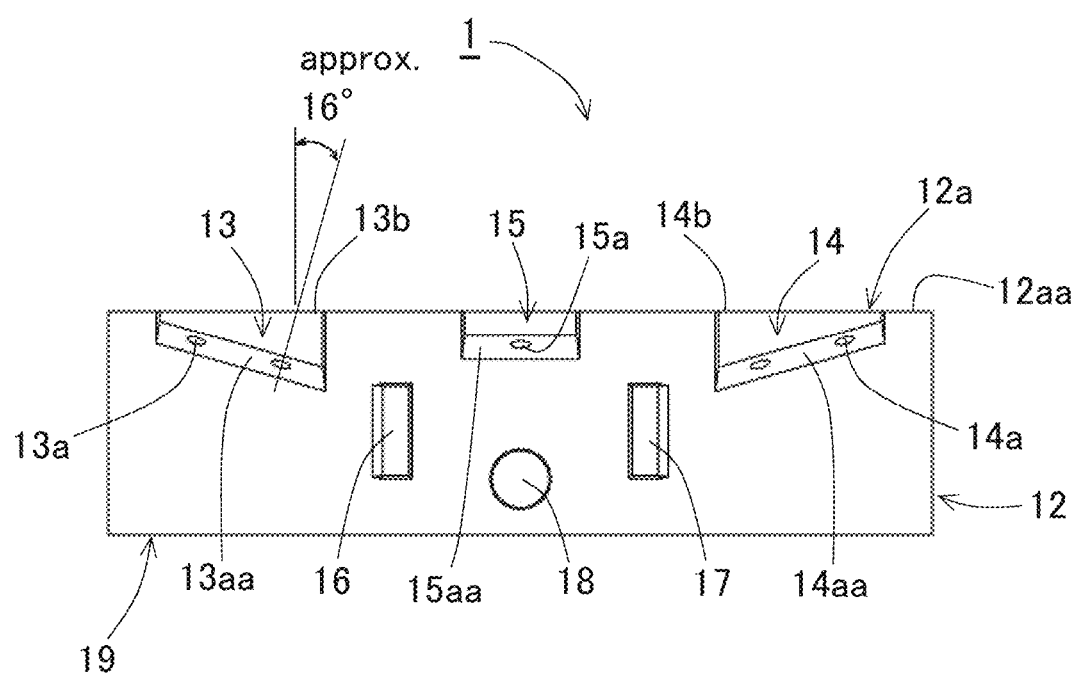
FIG. 14 is a plan view showing the dimensions of the fixing device for an article attaching member shown in FIGS. 1 to 6, which was used in the efficacy confirmation test.

The fixing device 1 according to the embodiment of the present invention had the configuration as shown in FIGS. 1 to 6, had the dimensions as shown in FIGS. 12 to 14, and was made of synthetic resin having physical properties similar to ABS resin. This device 1 was produced using a 3D printer.

As can be seen from FIGS. 12 to 14, the fixing device 1 produced for the said test had the dimensions described below.

Specifically, the length of the long side of the rectangular engagement wall 11 is 51.6 mm, the length of the short side thereof is 11 mm, and the thickness thereof is 1.5 mm. The diameter of the through hole 11a of the engagement wall 11 is 4 mm.

The length of the long side of the rectangular side wall 12 is 51.6 mm, the length of the short side thereof is 14 mm, and the thickness thereof is 1.5 mm. The first engaging portion 13, the second engaging portion 14, and the third engaging portion 15 all have an outward protrusion amount of 3.5 mm from the outer surface of the side wall 12.

One of the guide holes 13a of the first engaging portion 13, which is closer to the end of the side wall 12, is formed at a position 5.5 mm from the corresponding end face of the side wall 12. The other of the guide holes 13a of the first engaging portion 13, which is closer to the center of the side wall 12, is formed at a position 10.8 mm from the corresponding end face. Therefore, the distance between the two guide holes 13a of the first engaging portion 13 is 5.3 mm. The guide hole 15a of the third engaging portion 15 is formed at a position 15 mm from the guide hole 13a of the first engaging portion 13, which is closer to the center of the side wall 12. The position and shape of the second engaging portion 14 and its guide holes 14a are set to be a mirror image of the position and shape of the first engaging portion 13 and its guide holes 13a with respect to the center line of the fixing device 1. The third engaging portion 15 and its guide hole 15a are located on the center line of the fixing device 1.

The inclination angles of the two guide holes 13a of the first engaging portion 13 with respect to the short side (short axis) of the side wall 12 (the center line of the side wall 12) are approximately 35° toward the center of the engagement wall 11 in a plane including the outer surface of the engagement wall 11 (see FIG. 12), approximately 16° toward the center of the side wall 12 in a plane including the outer surface of the side wall 12 (see FIG. 14), and approximately 23° toward the space S in a plane perpendicular to the outer surfaces of the engagement wall 11 and the side wall 12 (see FIG. 13). The inclination angle of the two guide holes 14a of the second engaging portion 14 with respect to the short side (short axis) of the side wall 12 (the center line of the side wall 12) are symmetrical to those of the guide holes 13a of the first engaging portion 13 with respect to the center line of the fixing device 1. The inclination angle of the guide hole 15a of the third engaging portion 15 is equal to those of the guide holes 13a of the first engaging portion 13 and those of the guide holes 14a of the second engaging portion 14 in a plane perpendicular to the outer surfaces of the engagement wall 11 and the side wall 12.

The slope 13aa of the first engaging portion 13 is approximately perpendicular to the aforementioned extension direction of the two guide holes 13 of the first engaging portion 13.

The guide holes 13a of the first engaging portion 13, the guide holes 14a of the second engaging portion 14, and the guide hole 15a of the third engaging portion 15 all have the diameter of 1.2 mm. The nails 20 used have the outer diameter of 1 mm.

Figure 19B:
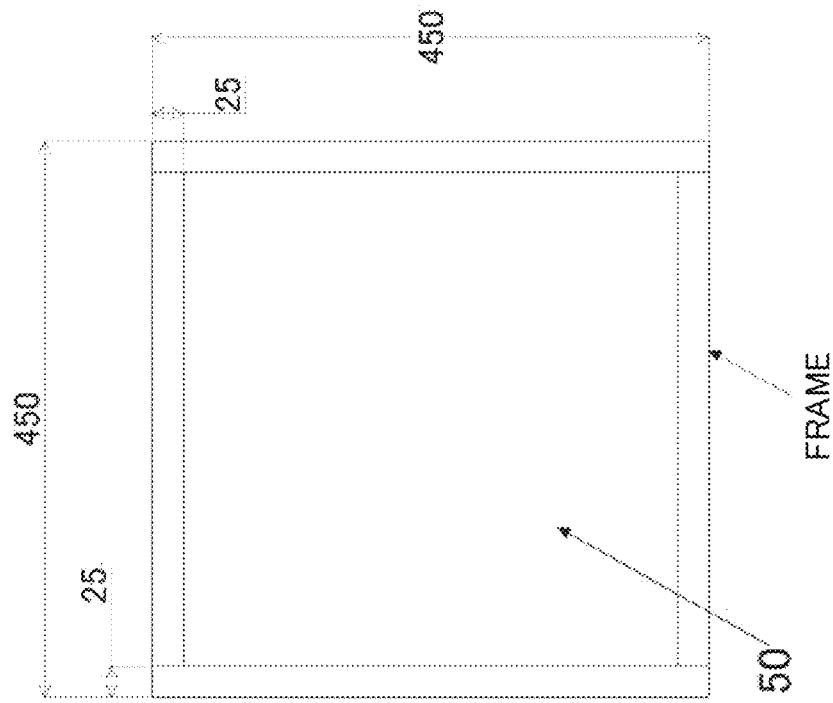
FIG. 19B is a rear view showing the structure and dimensions of the frame used in the efficacy confirmation test of the fixing device for an article attaching member shown in FIGS. 1 to 6.
Figure 19A:
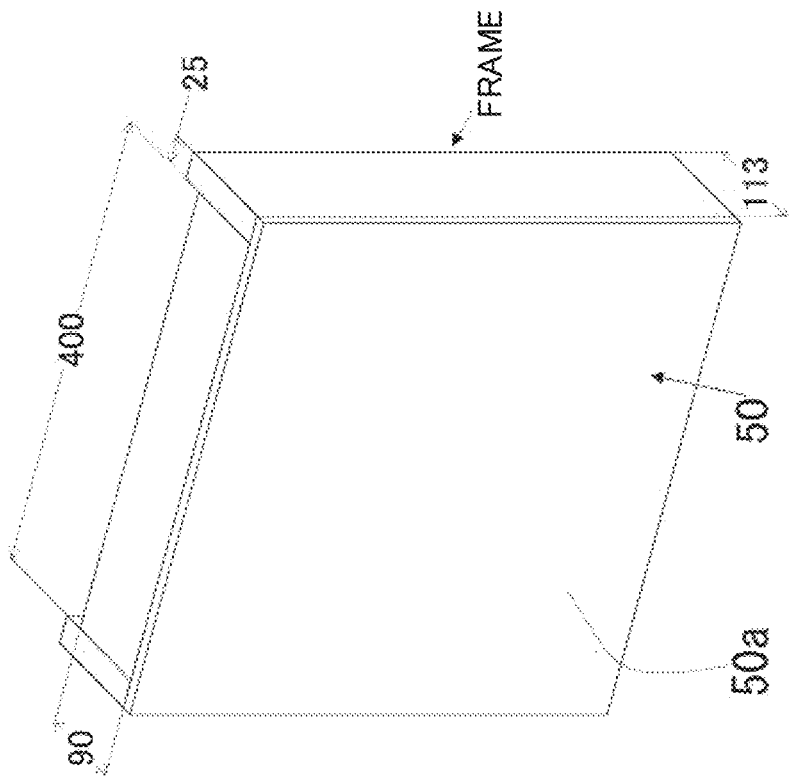
FIG. 19A is a perspective view showing the structure and dimensions of a frame used in the efficacy confirmation test of the fixing device for an article attaching member shown in FIGS. 1 to 6.

As the frame for a building, a rectangular frame material made of laminated pine wood, one opening surface of which was closed by a standard gypsum board 50 fixed thereto, was prepared. The other opening surface of the frame material (the frame) was left open. The specific structure and dimensions of the frame were set as shown in FIGS. 19A and 19B. That is, as shown in FIGS. 19A and 19B, the gypsum board 50 (which was manufactured by Yoshino Gypsum) has a square shape of 450 mm in length and width, and had a thickness of 12.5 mm. The left and right vertical plates constituting the frame are each rectangular with a length of 450 mm and a width of 113 mm, and a thickness of 25 mm. The upper and lower horizontal plates constituting the frame are each rectangular with a length of 400 mm and a width of 90 mm, and a thickness of 25 mm. As shown in FIGS. 20A and 20B, at the central part of the wall surface 50a made of the gypsum board 50 fixed to the frame, a JAS-approved structural plywood having a square shape of 250 mm in length and width and 12 mm in thickness was fixed as the article attaching member 40 using the four fixing devices 1 according to the embodiment of the present invention.

As an example of an article to be attached to the article attaching member 40, a commercially available pole-shaped hook (which was made of synthetic resin) was attached to the central part of the JAS-approved structural plywood as the article attaching member 40 in such a way as to be perpendicular to the wall surface 50*a*. The structure and dimensions of the hook are as shown in FIGS. 15, 16A, and 16B. That is, the hook includes a disc-shaped base part, a disc-shaped top part, and a cylindrical retaining part formed between the base part and the top part. The base part has a diameter of 45 mm and a height of 11.5 mm. The top part has a diameter of 37 mm and a height of 8 mm. The retaining part has a diameter of 30 mm and a height of 44.7 mm.

Figure 17A:
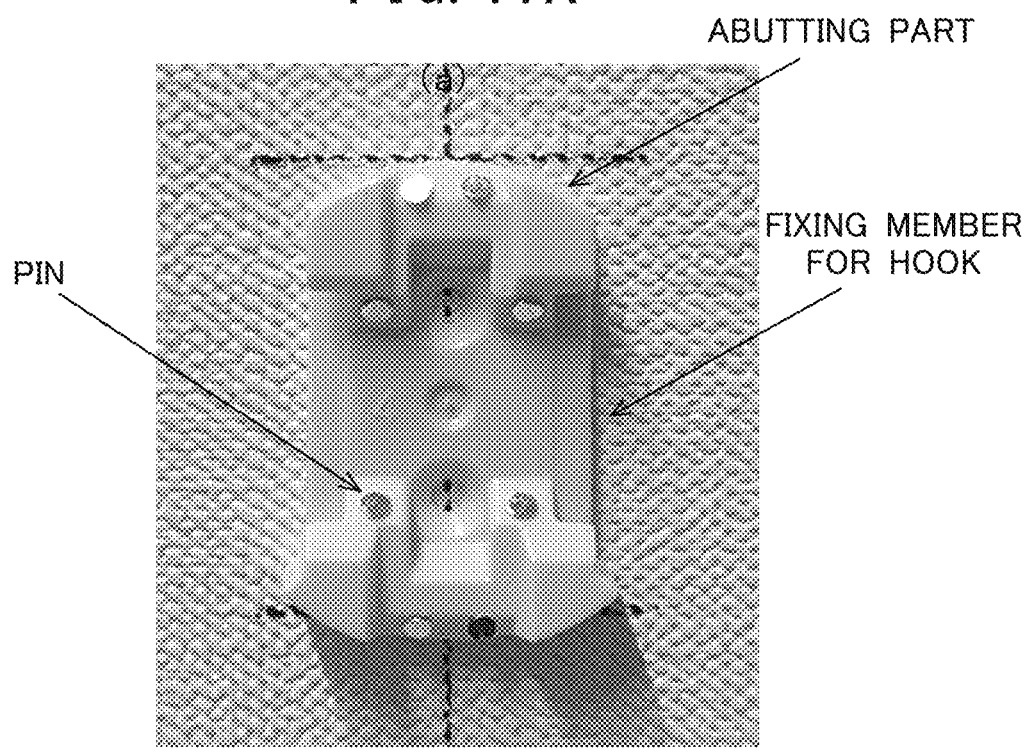
FIG. 17A is a photograph showing the state in which the fixing member for the pole-shaped hook (article to be attached) used in the efficacy confirmation test is fixed, in which the fixing member is fixed to the wall surface using pins (comparative example).
Figure 17B:
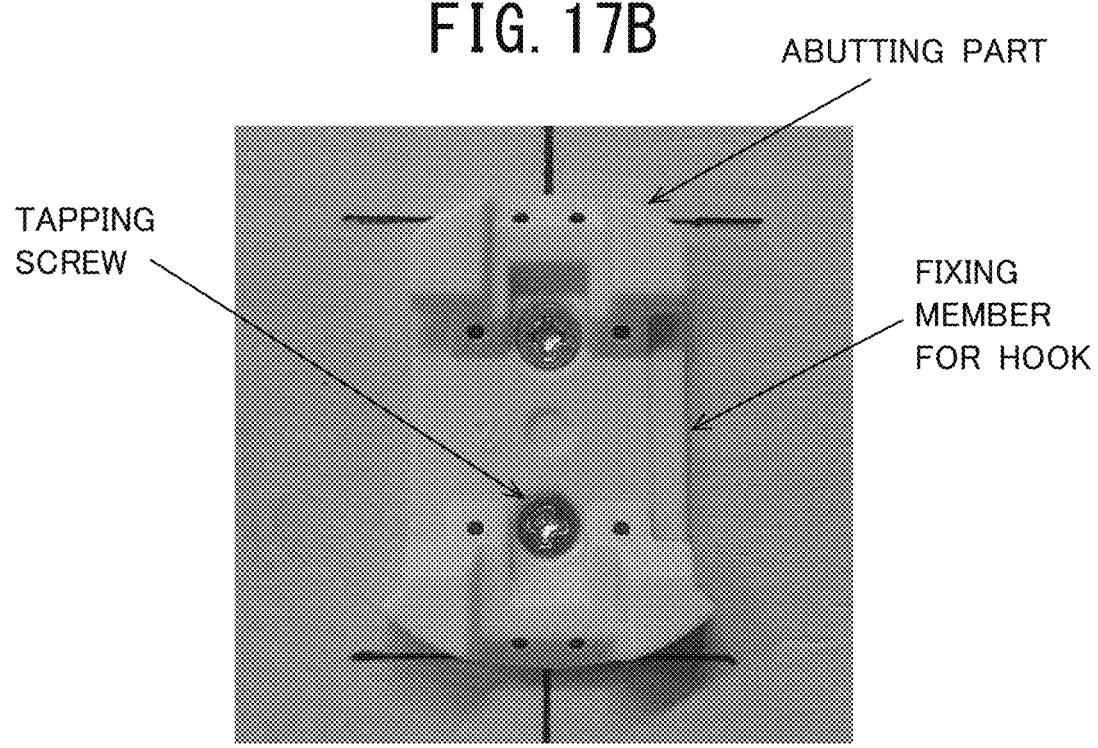
FIG. 17B is a photograph showing the state in which the fixing member for the pole-shaped hook (article to be attached) used in the efficacy confirmation test is fixed, in which the fixing member is fixed to the wall surface using tapping screws (the present invention).
Figure 18A:
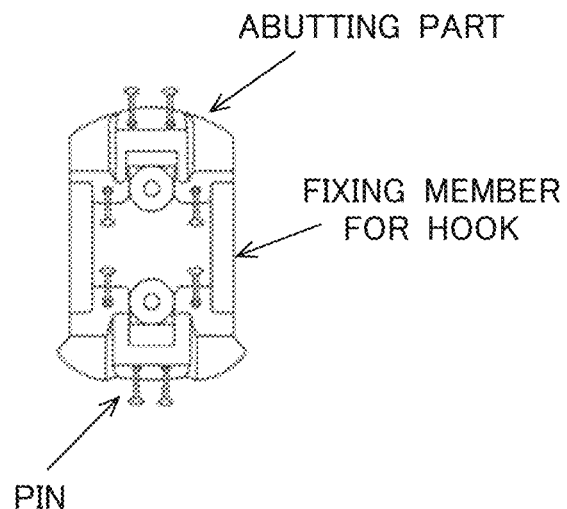
FIG. 18A is a view showing the state in which the fixing member for the pole-shaped hook (article to be attached) used in the efficacy confirmation test is fixed, which shows a view when the fixing member is fixed to the wall surface using pins (comparative example).
Figure 18B:
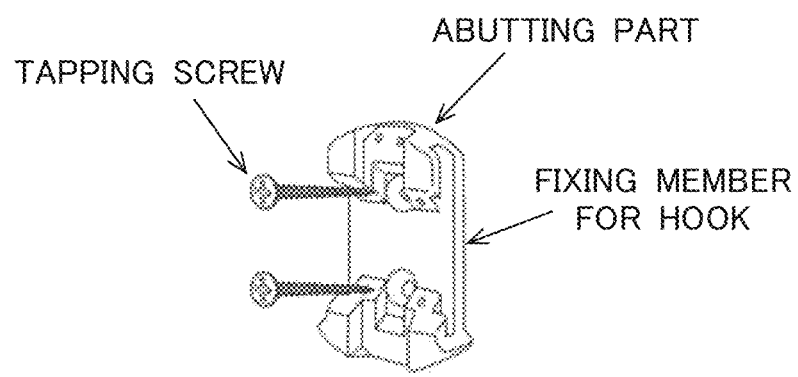
FIG. 18B is a view showing the state in which the fixing member for the pole-shaped hook (article to be attached) used in the efficacy confirmation test is fixed, which shows a view when the fixing member is fixed to the wall surface using tapping screws (present invention).

The main body (hook main body) of the pole-shaped hook shown in FIGS. 15, 16A, and 16B was fixed to the central part of the JAS-approved structural plywood as the article attaching member 40 using a dedicated fixing member having a configuration as shown in FIGS. 17B and 18B. At that time, instead of the tapping screws included with the hook, two separately prepared commercially available "flat head tapping screws for wood, 3 mm×12 mm" were used. This was because the total length of the included tapping screws was too long and thus, these tapping screws penetrated the article attaching member 40 (the said structural plywood) and reached the gypsum board 50. In order not to penetrate the gypsum board 50, the above-mentioned flat head tapping screws for wood were used instead.

The main body of the pole-shaped hook of FIGS. 15, 16A, and 16B was engaged with the said fixing member in the following wary. Specifically, the aforementioned dedicated fixing member fixed to the article attaching member 40 (the structural plywood) had its left and right outer edges parallel to each other and thus, the entirety of the said fixing member forms an "elongated protrusion" extending in the vertical direction, as shown in FIGS. 17B and 18B. On the other hand, a "vertical groove (engaging groove)" (a depression extending in the vertical direction) was formed on the bottom surface of the hook body (the back surface of the disk-shaped base part), as shown in FIGS. 16A and 16B. The "vertical groove" was formed in such a way as to fit into the "elongated protrusion" of the fixing member. Therefore, when the lower end of the "vertical groove" was pushed down from the upper end of the "elongated protrusion" of the fixing member while fitting the said lower end into the "elongated protrusion", the "vertical groove" was moved downward while being fitted into the "elongated protrusion". However, the stopper part formed at the upper end of the "vertical groove" (see FIG. 16B) was brought into contact with the abutting part formed at the upper end of the "elongated protrusion" (see FIG. 17B and FIG. 18B) and thus, the said stopper part was unable to descend any further. In this way, the main body of the hook was reliably held by and fixed to the article attaching member 40 (the structural plywood) by the fixing member at its stop position (see FIGS. 20A and 20B). The engagement of the hook body with the fixing member was conducted in such the manner as described here.

The frame to which the pole-shaped hook was fixed to the central part of the article attaching member 40 (the structural plywood) was fixed on the surface plate of the aforementioned precision universal testing machine, as shown in FIGS. 20A and 20B. Specifically, the frame was fixed on the horizontally arranged surface plate so as to be perpendicular to the wall surface 50*a* of the gypsum board 50. Two rod-shaped connecting members and four hexagon headed bolts were used for this fixation. The two connecting members were arranged at intervals on the upper end surface of the frame. Furthermore, the two hexagon headed bolts were disposed in front of the frame, the upper ends of the said two bolts were engaged with the front ends of the corresponding connecting members, and hexagonal nuts were respectively screwed into the upper ends of the said two bolts to be fixed to each other. Similarly, the other two hexagon headed bolts were arranged at the rear of the frame, the upper ends of the said two bolts were engaged with the rear ends of the corresponding connecting members, and hexagonal nuts were respectively screwed into the upper ends of the said two bolts to be fixed to each other. The state at this stage is as shown in FIGS. 20A and 20B.

After completing the preparation in the above-described manner, a vertically downward load was continuously applied to the center of the cylindrical retaining part of the aforementioned pole-shaped hook (the part located between the base part and the top part) shown in FIGS. 15, 16A, and 16B using the aforementioned precision universal testing machine (see the arrow A in FIG. 20B). After reaching the maximum load, application of the vertically downward load was continued until the load decreased to 60% of the maximum load or until the displacement reached 10 mm or more.

Test of Comparative Example

In order to compare with the result of the test of the fixing device 1 according to the present invention described above, a similar test was conducted on a comparative example. In the test of the comparative example, a frame having the same configuration as that used in the aforementioned test of the fixing device 1 according to the present invention was used. As the frame used in the test of the comparative example, similar to that used in the aforementioned test of the fixing device 1 according to the present invention, a rectangular frame material made of laminated pine wood, one opening surface of which was closed by a standard gypsum board 50 fixed thereto, was used. The other opening surface of the said frame material (the frame) was left open. The specific structure and dimensions of the said frame were set as shown in FIGS. 19A and 19B. However, unlike the aforementioned frame used in the test of the fixing device 1 according to the present invention, a JAS-approved structural plywood as the article attaching member 40 was not fixed at the central part of the wall surface 50*a* made of the gypsum board 50 fixed to the said frame. Therefore, in the test of the comparative example, the entire wall surface 50*a* made of the gypsum board 50 fixed to the said frame was exposed (see FIGS. 21A and 21B).

At the central part of the gypsum board 50 fixed to the said frame, a commercially available pole-shaped hook (which was made of synthetic resin), which was the same as that used in the aforementioned test of the fixing device 1 according to the present invention, was attached in such a way as to be perpendicular to the wall surface 50*a*. The structure and dimensions of the said hook are as shown in FIGS. 15, 16A, and 16B.

The main body (hook main body) of the pole-shaped hook shown in FIGS. 15, 16A, and 16B was fixed to the central part of the gypsum board 50 using a dedicated fixing member having a configuration shown in FIGS. 17A and 18A. At that time, eight dedicated pins which were included with the hook were used.

When engaging the main body of the pole-shaped hook of FIGS. 15, 16A, and 16B with the fixing member, similar to the case of the fixing device 1 according to the present invention, the lower end of the "vertical groove" formed on the bottom surface of the hook main body was pushed down from the upper end of the "elongated protrusion" of the fixing member while fitting the said lower end into the "elongated protrusion" and then, the said lower end was lowered until the stopper part (see FIG. 16B) formed at the upper end of the "vertical groove" was brought into contact with the abutting part (see FIG. 17B and FIG. 18B) formed at the upper end of the "elongated protrusion". Thus, the hook main body was reliably held by and fixed to the wall surface 50a by the fixing member at its stop position (see FIGS. 21A and 21B).

Figure 21A:
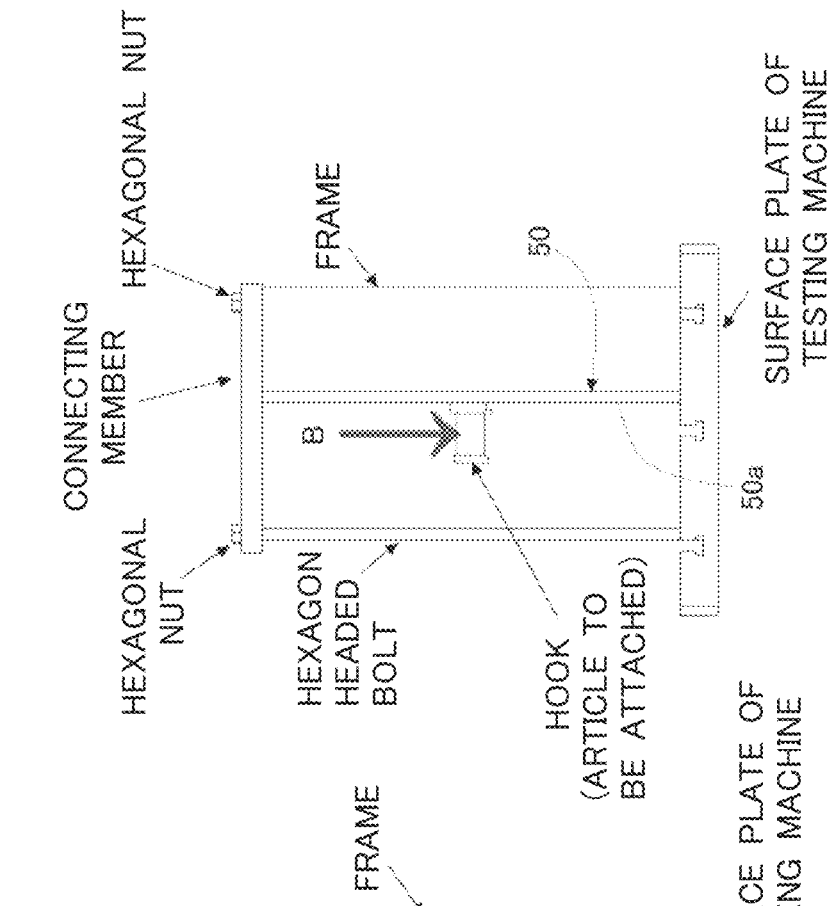
FIG. 21A is a perspective view showing the test method view of the comparative example.
Figure 21B:
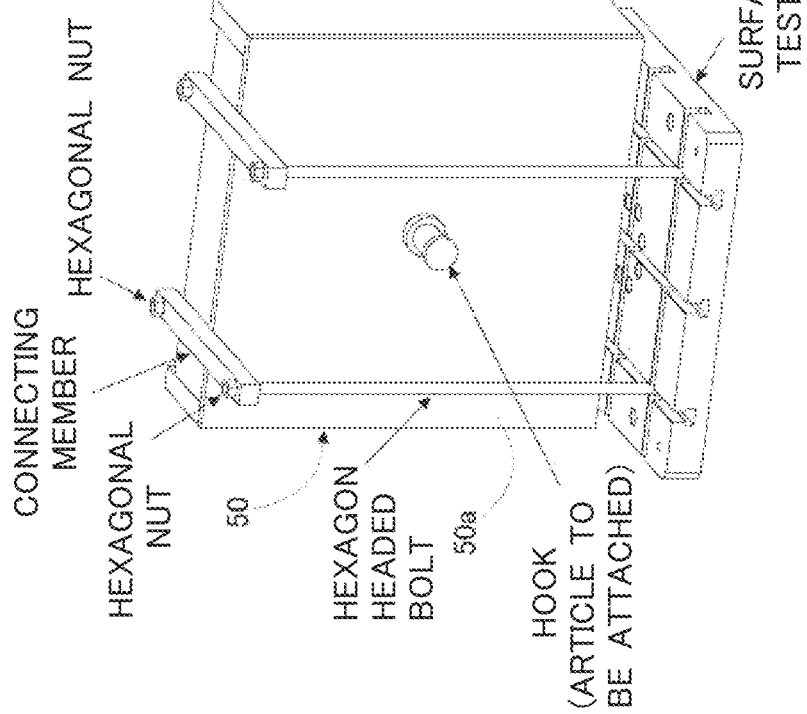
FIG. 21B is a right side view showing the test method of the comparative example.

The frame to which the pole-shaped hook was fixed at the central part of the wall surface 50a made of the gypsum board 50 was fixed on the surface plate of the aforementioned precision universal testing machine, as shown in FIGS. 21A and 21B. The method of fixing the said frame was the same as that used in the test of the fixing device 1 according to the present invention described above.

After completing the preparation in the above-described manner, a vertically downward load was continuously applied to the center of the cylindrical retaining part of the pole-shaped hook (the part located between the base part and the top part) shown in FIGS. 15, 16A, and 16B using the aforementioned precision universal testing machine (see the arrow B in FIG. 21B). After reaching the maximum load, application of the vertically downward load was continued until the load decreased to 60% of the maximum load or until the displacement reached 10 mm or more. This is the same as the test of the fixing device 1 according to the invention described above.

(Test Results)

The test results of the efficacy confirmation tests conducted as described above are shown in FIGS. 22 to 24. As is clear from these test results, the maximum load of 394.51 N was obtained for a sample 1 of the fixing device 1 according to the present invention, the maximum load of 348.87 N was obtained for a sample 2 of the device 1, and the maximum load of 439.77 N was obtained for a sample 3 of the device 1. All of these values are strong enough to fix an article or articles to the fragile wall surface 50a made of the gypsum board 50 or the like, where it is difficult to attach an article or articles using screws or nails, mechanically using screws or nails, or physically using magnetic force, etc. Further, the maximum displacement was 5.07 mm for the sample 1 of the device 1, 4.24 mm for the sample 2 of the device 1, and 6.97 mm for the sample 3 of the device 1. As described later, there was no abnormality in the fixing device 1 and the article attaching member 40 (the aforementioned structural plywood) and thus, it is presumed that even with these degrees of displacement, no problem would occur in the aforementioned fixing device 1 according to the present invention.

Furthermore, no abnormality was observed in the aforementioned fixing device 1 according to the present invention, and no rattling and no displacement of the article attaching member 40 (the aforementioned structural plywood) occurred. In all of the samples 1 to 3 of the fixing device 1 according to the present invention, the tapping screws for fixing the pole-shaped hook were partially disconnected (came out) and almost fell off before the fixing device 1 was destroyed.

On the other hand, in the test of the comparative example, the maximum load of 80.80 N was obtained for a sample 1 of the comparative example, the maximum load of 65.93 N was obtained for a sample 2 thereof, and the maximum load of 74.85 N was obtained for a sample 3 thereof. Therefore, it can be seen that the maximum load in the comparative example is as low as (¼) to (⅙) of that in the fixing device 1 according to the present invention. Moreover, since the maximum displacement in the comparative example was 4.32 mm for the sample 1, 6.77 mm for the sample 2, and 5.47 mm for the sample 3, It can be seen that the maximum displacement in the comparative example is almost equivalent to that of the fixing device 1 according to the present invention. In the comparative example, since the fixing member was fixed with the eight dedicated pins, none of the samples 1 to 3 could withstand the applied load, and the dedicated pins fell off from the gypsum board 50; as a result, the hook itself also fell off. Therefore, in the comparative example, only (¼) to (⅙) of the maximum load of the fixing device 1 according to the present invention could be obtained and thus, it can be seen that a heavy article cannot be attached. Unlike this, in the fixing device 1 according to the present invention, since a sufficiently large maximum load (approximately 4 to 6 times that of the comparative example) could be obtained, it can be seen that the fixing device 1 can sufficiently withstand the weight which is calculated by adding the weight of the article or articles attached to the article attaching member 40 (article(s) to be attached) to the weight of the article attaching member 40 (the aforementioned structural plywood), that is, the total weight of the article attaching member 40 and the article or articles to be attached.

In addition, in the above-mentioned efficacy confirmation test, the total strength of the four fixing devices 1 was measured on the supposition of the actual usage situation of the fixing device 1 according to the present invention, and the strength of the single fixing device 1 was not measured. However, it is understood that no problem will occur. This is because, as explained in the aforementioned embodiment, the fixing device 1 according to the present invention was created on the presumption that a plurality of the fixing devices 1 are used in combination according to the shape of the article attaching member 40 and/or the number of the engaged portions 40a of the said member 40.

(Effects of Fixing Device for Article Attaching Member)

With the fixing device 1 for an article attaching member according to the embodiment of the present invention, as is clear from the detailed explanation above, since the above-described configuration is provided, when the first, second, and third engaging portions 13, 14, and 15 are engaged with the wall surface 50a by pushing the nails 20 inserted respectively through the guide holes 13a formed in the first engaging portion 13 into the wall surface 50a in the first direction and pushing the nails 20 inserted respectively through the guide holes 14a formed in the second engaging portion 14 into the wall surface 50a in the second direction (which is different from the first direction), and by pushing the nail 20 inserted through the guide hole 15a formed in the third engaging portion 15 into the wall surface 50a in the third direction (which is different from the first and second directions) in the state where the contact surfaces 13b, 14b, and 15b of the first, second, and third engaging portions 13, 14, and 15 and the contact surface 12aa of the side wall 12 are contacted with the wall surface 50a, the space S formed by the engagement wall 1 and the side wall 12 is located on the wall surface 50a. The space S is capable of receiving the engaged portion 41 of the article attaching member 40, and the engaged portion 41 of the member 40 received in the space S is adapted to be engaged with the engagement wall 11.

Therefore, for example, if the engaged portion 41 of the article attaching member 40 is received in (engaged with) the space S before engaging the first, second, and third engaging portions 13, 14, and 15 with the wall surface 50a using the nails 20 in the aforementioned manner and then, the engaged portion 41 and the engagement wall 11 are connected together by the wood screw 30 serving as the connecting means in that state, it is possible to fix the article attaching member 40 to the wall surface 50a at the desired position by simply engaging the first, second, and third engaging portions 13, 14, and 15 with the wall surface 50a.

Alternatively, if the engaged portion 41 of the article attaching member 40 is received in (engaged with) the space S after engaging the first, second, and third engaging portions 13, 14, and 15 with the wall surface 50a using the nails 20 in the aforementioned manner and then, the engaged portion 41 and the first, second, and third engaging portions 13, 14, and 15 are connected together by the wood screw 30 serving as the connecting means in that state, it is possible to fix the article attaching member 40 to the wall surface 50a at the desired position only by the first, second, and third engaging portions 13, 14, and 15 engaged with the wall surface 50a.

Further, the guide holes 13a, 14a, and 15a, which are respectively formed in the first, second, and third engaging portions 13, 14, and 15, include the first engaging portion 13 formed to guide the inserted nails 20 in the first direction, the second engaging portion 14 formed to guide the inserted nails 20 in the second direction which is different from the first direction, and the third engaging portions 15 formed to guide the inserted nails 20 in the third direction which is different from the and second directions. Moreover, the guide holes 13a of the first engaging portion 13 are arranged along the outer surface of the side wall 12 on one side of the side wall 12 (the side edge portion 12a) or in a vicinity thereof, the guide holes 14a of the second engaging portion 14 are arranged along the outer surface of the side wall 12 on the same side of the side wall 12 (the side edge portion 12a) or in a vicinity thereof, and the guide hole 15a of the third engaging portion 15 is formed along the outer surface of the side wall 12 on the same side of the side wall 12 (the side edge portion 12a) or in a vicinity thereof. Thus, the nails 20 which are inserted respectively through the guide holes 13a of the first engaging portion 13 and pushed into the wall surface 50a, the nails 20 which are inserted respectively through the guide holes 14a of the second engaging portion 14 and pushed into the wall surface 50a, and the nail 20 which is inserted through the guide hole 15a of the third engaging portion 15 and pushed into the wall surface 50a are located at positions (regions) apart (displaced) from each other, and these nails 20 are extended in different directions from each other in the inside of the wall surface 50a. For this reason, the fixing device 1 is mechanically supported on the wall surface 50a by the nails 20 extending in the different directions at the mutually distant (displaced) positions (regions). Accordingly, the mechanical strength when the fixing device 1 is fixed to the wall surface 50a is sufficient.

Moreover, what is required to fix the fixing device 1 to the wall surface 50a is the work of engaging the first, second, and third engaging portions 13, 14, and 15 to the wall surface 50a in the aforementioned manner using the nails 20 and the work of connecting the engaged portion 41 of the article attaching member 40 and the engagement wall 11 together by the wood screw 30 as the connecting means after the engaged portion 41 is received in (engaged with) the space S. Therefore, the work required to fix the fixing device 1 to the wall surface 50a is easy.

As a result, with the fixing device 1 according to the present embodiment, there is an advantageous effect that (a) the article attaching member 40, to which a desired article or articles is/are attachable, can be fixed to the fragile wall surface 50a made of the gypsum board 50 or the like with sufficient mechanical strength by easy work. Regarding this mechanical strength, it has been confirmed by the inventors of the present invention that sufficient mechanical strength to hold the total weight including not only the weight of the article attaching member 40 but also the weight of one or more various articles (articles to be attached) that are assumed to be attached to the article attaching member 40 later can be realized (see the aforementioned efficacy confirmation test).

Note that it is preferable to use two or more of the fixing devices 1 according to the present embodiment in combination, depending on the shape and number of the engaged portions 41 of the article attaching member 40. This is because the member 40 is fixed at two or more places using the two or more fixing devices 1 and thus, the member 40 can be fixed to the wall surface 50a with higher mechanical strength than the case where the only one fixing device 1 is used, which means that the fixing strength of the member 40 as a whole can be further increased.

In addition to the above-mentioned advantageous effects, the fixing device 1 according to the present embodiment has the following advantageous effects also.

Specifically, by using the fixing device 1 according to the present embodiment, the article attaching member 40, to which a desired article or articles is/are attachable, can be fixed to the fragile wall surface 50a made of the gypsum board 50 or the like with sufficient mechanical strength and therefore, a desired article or articles can be attached arbitrarily using the article attaching member 40 thus fixed. As a result, with the fixing device 1 according to the present embodiment, there is a further advantageous effect that (b) a desired article or articles can be attached to the fragile wall surface 50a made of the gypsum board 50 or the like even if the products such as the aforementioned article attaching device of Patent Literature 1 and the aforementioned article fixing structure of Patent Literature 2, which are devised to enable fixation of an article or articles such as hooks and hangers to a wall surface made of gypsum board without using the "gypsum board anchor", are not used.

Furthermore, when the fixing device 1 according to the present embodiment is used, the article attaching member 40, to which a desired article or articles is/are attachable, can be fixed to the fragile wall surface 50a made of the gypsum board 50 or the like with sufficient mechanical strength as described above. Thus, it is possible to attach a desired number of desired articles arbitrarily using the article attaching member 40 which has been fixed in this way. That is, the desired article or articles is/are not directly fixed to the wall surface 50a but is/are fixed to the article attaching member 40 which has been fixed to the wall surface 50a using the fixing device 1. As a result, by appropriately selecting the shape and/or material of the article attaching member 40, it is possible to attach a desired article or articles to the wall surface 50a mechanically using screws or nails, or physically using magnetic force or the like. For example, if a wooden board is used as the article attaching member 40, articles such as hooks and hangers can be attached mechanically using screws or nails. If an iron plate is used as the article attaching member 40, articles such as hooks and hangers can be attached physically using magnetic force. Furthermore, the number of articles to be attached can be increased up to an allowable value that depends on the size and/or withstand load (the limit of allowable weight) of the article attaching member 40.

Accordingly, with the fixing device 1 according to the present embodiment, there is a still further advantageous effect that (c) it is possible to significantly expand both the types and number of articles that can be attached to the fragile wall surface 50*a* made of the gypsum board 50 or the like than before.

Furthermore, when the fixing device 1 according to the present embodiment is used, the article attaching member 40, to which a desired article or articles is/are attachable, can be fixed to the fragile wall surface 50*a* made of the gypsum board 50 or the like with sufficient mechanical strength as described above. Thus, it is possible to attach a desired number of desired articles arbitrarily using the article attaching member 40 which has been fixed in this way. This means that convenience of daily life for users and purchasers of buildings including the fragile wall surfaces 50*a* made of the gypsum board 50 or the like is increased dramatically by simple work of purchasing the fixing device 1 and fixing it to the wall surface 50*a* only.

Additionally, for builders involved in the construction of this type of building, this means that there is an added benefit of "improving the convenience of daily life" for the users and purchasers of this type of building (although some additional cost is required) by simply adding the work of installing the fixing device 1 at an appropriate location on the fragile wall surface 50*a* made of the gypsum board 50 or the like during interior construction. Therefore, regarding buildings including the gypsum board (or similar materials) which has the property of being inexpensive but extremely structurally strong and the high heat and sound insulation properties, builders can appeal to potential customers through advertisements and promotions with the following message: Not only the problem of the gypsum board (and its similar products) that "it is difficult to attach articles using screws or nails" is solved but also the property of high convenience that "you can attach as many desired articles as you like directly to the wall surface, even if you do not use any product that has been devised to enable fixation of an article or articles to the wall surface made of gypsum board" is obtainable. This means that the convenience for builders is high as well.

Accordingly, with the fixing device 1 according to the present embodiment, there is a still further advantageous effect that (d) high convenience can be provided not only to users and purchasers of buildings including the fragile wall surfaces 50*a* made of the gypsum board 50 or the like but also to builders involved in the construction of this type of buildings.

In addition, with the fixing structure for an article attaching member according to the present invention, it is obvious that the same advantageous effects as those obtained by the aforementioned fixing device 1 for an article attaching member according to the present embodiment are obtainable.

Other Embodiments

The above-described embodiment shows an example that embodies the present invention. Thus, it goes without saying that the present invention is not limited to the aforementioned embodiment and that various modifications can be made without departing from the spirit of the present invention.

For example, the fixing device 1 according to the above-described embodiment includes the rectangular plate-shaped engagement wall 11 and the rectangular plate-shaped side wall 12 that are connected at the connecting portion 19 at a right angle and has a generally L-shaped cross section as a whole. However, the present invention is not limited thereto. It is sufficient that the fixing device 1 comprises the engagement wall 11 and the side wall 12 which is connected to the connecting portion 19 of the engagement wall 11 and which is formed to intersect with the engagement wall 11, and the space S capable of receiving the engaged portion 41 of the article attaching member 40 is formed by the engagement wall 11 and the side wall 12. The shape and size of the space S are arbitrary.

In other words, it is sufficient that the space S has a shape and size that is capable of receiving one engaged portion 41 of the article attaching member 40 and that allows the received engaged portion 41 to be engaged with the engagement wall 11. The engaged portion 41 received in the space S may or may not be engaged with the side wall 12. However, it is preferred that the engaged portion 41 received in the space S is not only engaged with the engagement wall 11 but also engaged with the side wall 12 compared with the case where the said engaged portion 41 is engaged only with the engagement wall 11. This is because the strength and stability for fixing the said engaged portion 41 to the wall surface 50*a* are increased.

Further, with the fixing device 1 according to the aforementioned embodiment, the engagement wall 11 is shaped rectangular; however, the present invention is not limited thereto. It is needless to say that the shape of the engagement wall 11 may be arbitrary. The engagement wall 11 may be of any type as long as the corresponding engaged portion 41 of the article attaching member 40 can be engaged with the said wall 11 to hold the said member 40 on the wall surface 50*a* with desired strength. The shape of the engagement wall 11 can be determined arbitrarily taking the strength and decoration into consideration thereof.

Furthermore, with the fixing device 1 according to the aforementioned embodiment, the shape of the side edge of the engagement wall 11 located on the opposite side to the connecting portion 19 can also be changed as appropriate. For example, the said side edge of the engagement wall 11 may have a convex arc shape or a concave arc shape.

Furthermore, with the fixing device 1 according to the aforementioned embodiment, the shape of the side wall 12 can also be changed as appropriate. However, it is preferable that the side wall 12 has the shape of a rectangular plate as shown in the aforementioned embodiment because the side wall 12 is engaged with the wall surface 50*a* using the first to third engaging portions 13, 14, and 15. However, if no problem arises in mechanical strength and/or durability, the side wall 12 may have the shape of a rectangular plate with a through hole or a void provided in a portion thereof. It is sufficient that the side wall 12 achieves the function that the first to third engaging portions 13, 14, and 15 are formed on the side edge portion 12*a* which is located on the opposite side to the engagement wall 11 and that the engagement wall 11 is engaged with the wall surface 50*a* by way of the first to third engaging portions 13, 14, and 15.

Furthermore, with the fixing device 1 according to the aforementioned embodiment, the shapes of the first to third engaging portions 13, 14, and 15 can also be changed as appropriate. It is preferable that each of the first to third engaging portions 13, 14, and 15 is formed into a shape as shown in the above-described embodiment. However, if there is no problem with mechanical strength and/or durability, each of the first to third engaging portions 13, 14, and 15 may have any shape other than the shape shown in the above-described embodiment. The first to third engaging portions 13, 14, and 15 may be respectively integrated into the side wall 12, thereby forming a single engaging portion. In this case, if guide holes similar to the guide holes 13*a*, 14*a*, and 15*a* of the first to third engaging portions 13, 14, and 15 are formed in the single engaging portion, it is possible to perform the same function as the fixing device 1 according to the aforementioned embodiment. It is sufficient that the function of engaging the engagement wall 11 with the wall surface 50$a$ by way of the side wall 12 using the nails 20 or pins is achieved; thus, the shapes, sizes, and numbers of the first to third engaging portions 13, 14, and 15 can be set arbitrarily.

Furthermore, with the fixing device 1 according to the aforementioned embodiment, the connecting portion 19 is provided on one side edge of the engagement wall 11; however, the present invention is not limited thereto. It is sufficient that the connecting portion 19 is a portion to which the side wall 12 and the engagement wall 11 are to be connected; the shape and position of the connecting portion 19 are arbitrary. Therefore, the connecting portion 19 does not need to be one side edge of the engagement wall 11, and the connecting portion 19 may be located inward from the said side edge so that the said side edge of the engagement wall 11 protrudes to the outside of the side wall 12.

Furthermore, with the fixing device 1 according to the aforementioned embodiment, the engaging wall 11 has the through hole 11$a$ through which the wood screw 30 as a coupling means is inserted; however, the through hole 11$a$ may be omitted. In this case, for example, by disposing a suitable glue or adhesive between the engagement wall 11 and the engaged portion 41 of the article attaching member 40 as a coupling means, the engaging wall 11 and the engaged portion 41 can be connected together. Instead of the wood screw 30, a connecting nail or pin as a connecting means may be inserted into the through hole of the engagement wall 11. Moreover, if a through hole is formed in the engagement wall 11 and a small bolt is embedded in the engaged portion 41, the engagement wall 11 and the engaged portion 41 can be connected together by inserting the exposed end of the small bolt of the engaged portion 41 through the through hole of the engagement wall 11 and screwing a nut to the said exposed end. Furthermore, if small magnets are respectively placed on the engaged portion 41 and the engagement wall 11, the fixing device 1 can be connected to the engaged portion 41 by magnetic force in the state where the engaged portion 41 is received in the space S. In the case where the article attaching member 40 itself is made of iron, or at least its engaged portion 41 is made of iron, the fixing device 1 can be connected to the engaged portion 41 by magnetic force by simply embedding the aforementioned magnet in the engagement wall 11.

Furthermore, with the fixing device 1 according to the aforementioned embodiment, the article attaching member 40 is formed by a rectangular wooden plate, and the four corners thereof are respectively used as the engaged portions 41 (see FIG. 25). This is because while keeping the case where the member 40 is fixed to the wall surface 50$a$ made of the gypsum board 50 so as to partially cover the said wall surface 50$a$ in mind, the improvement of the workability of the builder who performs the aforementioned work is taken into consideration. However, the shape, size, and material of the member 40 are all arbitrary and can be selected as necessary. On the other hand, it is also conceivable that the member 40 itself is used as a decoration for the wall surface 50$a$ also. In that case, the shape of the member 40 may be set to a shape to which designability (decorativeness) has been added (for example, octagonal, heart-shaped, mountain-shaped, island-shaped, etc.) while taking the installation location also into consideration.

Furthermore, although the fixing device 1 according to the aforementioned embodiment is formed using a 3D printer from synthetic resin having physical properties similar to ABS resin, the present invention is not limited thereto. The fixing device 1 can also be formed from a synthetic resin other than the aforementioned resin, for example, ABS resin or a synthetic resin other than ABS resin. When producing the fixing device 1 in large quantities, it is preferable to use a known integral molding method instead of a 3D printer. It goes without saying that the fixing device 1 can be formed using a method other than the 3D printer and the integral molding method.

Furthermore, with the fixing device 1 according to the aforementioned embodiment, the article attaching member 40 to be fixed is made of wood; however, the present invention is not limited to this. It goes without saying that the article attaching member 40 may be made of any material other than wood, such as a plate-shaped material made of iron. In this case, a desired article or articles (an article or articles to be attached) can be attached to the member 40 using, for example, magnetic force. A plate-shaped material made of a synthetic resin can also be used as the article attaching member 40. In this case, a desired article or articles (an article or articles to be attached) can be attached to the member 40 using, for example, an adhesive.

Furthermore, with the fixing device 1 according to the aforementioned embodiment, the wall surface 50$a$ made of the gypsum board 50 is explained; however, it goes without saying that the present invention is not limited this. The present invention is applicable to a wall surface made of a material other than the gypsum board 50, as long as it is difficult to attach an article or articles using screws or nails, similar to the gypsum board 50.

Furthermore, with the aforementioned embodiment, the nails 20 are used to fix the fixing device 1 to the wall surface 50$a$; however, the present invention is not limited to this. Pins may be used instead of the nails 20. According to the dictionary, a nail has the meaning that "a thin stick of metal, bamboo, wood, etc. with one end pointed. It is used to drive things in to join or fix things, or to hang things." On the other hand, a pin has the meaning that "a tool for fastening things by pricking or pinching. Insect pins, tie pins, hair pins, safety pins, etc." Thus, both nails and pins have one thing in common: they are tools for fixing things. However, nails are understood to refer to tools that are suitable for fixing things with a certain amount of weight, and pins are understood to refer to tools that are suitable for fixing lighter things than nails. Thus, it can be said that they are different in that respect. However, the point is that it is sufficient that the fixing device 1 can be fixed to the wall surface 50$a$ by inserting it through the guide hole 13$a$, 14$a$, or 15$a$ and pushing it into the wall surface 50$a$. Therefore, as long as it satisfies the above conditions, it is applicable to the present invention regardless of whether it is called a "nail" or a "pin."

INDUSTRIAL APPLICABILITY

The fixing device for an article attaching member and the article fixing structure using the same according to the present invention can be used widely in cases where attachment of various articles to fragile wall surfaces (for example, a wall surface made of gypsum board or the like), to which it is difficult to attach an article or articles using screws or nails, needs to be realized easily at a low cost.

DESCRIPTION OF REFERENCE SIGNS

1 fixing device
11 engagement wall 11a through hole
11b tapered face
12 side wall
12a side edge portion of side wall
12aa contact surface of side wall
13 first engaging portion
13a guide hole of first engaging portion
13aa slope of first engaging portion
13b contact surface of first engaging portion
14 second engaging portion
14a guide hole of second engaging portion
14aa slope of second engaging portion
14b contact surface of second engaging portion
15 third engaging portion
15a guide hole of third engaging portion
15aa slope of third engaging portion
15b contact surface of third engaging portion
16 engaging protrusion
17 engaging protrusion
18 protrusion
19 connecting portion
20 nail
30 wood screw
40 article attaching member
40a surface of article attaching member
40b upper side face of article attaching member
40c left side face of article attaching member
40d lower side face of article attaching member
40e right side face of article attaching member
41 engaged portion of article attachment member
50 gypsum board
50a wall surface
S space

The invention claimed is:

1. A fixing device configured to be used for fixing an article attaching member, to which a desired article or articles is/are attachable, to a fragile wall surface, comprising:
an engagement wall formed to be engaged with a predetermined engaged portion of the article attaching member;
a side wall connected to a connecting portion of the engagement wall, the side wall being formed so as to intersect with the engagement wall, wherein the side wall has an elongated shape extending along a predetermined axis; and
one or more engaging portions formed on a portion of the side wall located at an opposite side to the connecting portion so as to protrude outward from an outer surface of the side wall, the one or more engaging portions having guide holes that are configured such that nails or pins are respectively inserted through the guide holes to be guided in predetermined directions, wherein the portion of the side wall has an elongated shape extending along the axis, and wherein the guide holes are divided into two or more groups including a first group and a second group;
wherein one or more of the guide holes that belong to the first group is/are configured such that one or more nails or pins is/are inserted through the one or more of the guide holes and such that the one or more nails or pins is/are guided by the one or more of the guide holes in a first direction;
one or more of the guide holes that belong to the second group is/are configured such that one or more nails or pins is/are inserted through the one or more of the guide holes and such that the one or more nails or pins is/are guided by the one or more of the guide holes in a second direction which is different from the first direction;
the one or more of the guide holes that belong to the first group is/are located along an outer surface of the side wall on one side of the side wall;
the one or more of the guide holes that belong to the second group is/are located along the outer surface of the side wall on the other side of the side wall;
the engagement wall and the side wall form a space capable of receiving the engaged portion of the article attaching member, and the engaged portion and the engagement wall are configured to be connectable together with a connecting means in a state where the engaged portion is received in the space;
the one or more engaging portions is/are configured to be engaged with the wall surface by nails or pins which are respectively inserted through the guide holes that belong to the first group and the second group and pushed into the wall surface in a state where the one or more engaging portions is/are contacted with the wall surface;
when fixing the article attaching member at a desired position on the wall surface, the one or more engaging portions is/are engaged with the wall surface by one or more nails or pins which is/are inserted through the one or more of the guide holes that belong to the first group and pushed into the wall surface in the first direction, and one or more nails or pins which is/are inserted through the one or more of the guide holes that belong to the second group and pushed into the wall surface in the second direction; and
the engaged portion of the article attaching member received in the space and the engagement wall are connected together by the connecting means, thereby fixing the article attaching member at the desired position.

2. The fixing device according to claim 1, wherein the connecting means for connecting the engaged portion and the engagement wall together is a screw member having a male thread.

3. The fixing device according to claim 1, wherein the connecting means for connecting the engaged portion and the engagement wall together is a connecting nail or pin.

4. The fixing device according to claim 1, wherein the connecting means for connecting the engaged portion and the engagement wall together is a glue or adhesive.

5. The fixing device according to claim 1, wherein the connecting means for connecting the engaged portion and the engagement wall together is a magnet.

6. The fixing device according to claim 1, wherein as the one or more engaging portions, a first engaging portion formed at one end of the side wall or in a vicinity thereof, and a second engaging portion formed at the other end of the side wall or in a vicinity thereof are included;
wherein the one or more of the guide holes that belong to the first group is/are disposed in the first engaging portion, and a slope which is approximately perpendicular to the first direction is formed on a surface of the first engaging portion; and
the one or more of the guide holes that belong to the second group is/are disposed in the second engaging portion, and a slope which is approximately perpendicular to the second direction is formed on a surface of the second engaging portion.

7. The fixing device according to claim 6, wherein the one more of the guide holes of the first engaging portion is/are configured to be inclined toward an inner side of the side wall and to be inclined toward a center of the side wall along the outer surface of the side wall, and the one or more of the guide holes of the first engaging portion is/are configured such that one or more nails or pins which is/are entirely inserted through the one or more of the guide holes is/are located in the inside of the side wall; and the one or more of the guide holes of the second engaging portion is/are configured to be inclined toward the inner side of the side wall and to be inclined toward the center of the side wall along the outer surface of the side wall, and the one or more of the guide holes of the second engaging portion is/are configured such that one or more nails or pins which is/are entirely inserted through the one or more of the guide holes is/are located in the inside of the side wall.

8. The fixing device according to claim 1, wherein in addition to the first group and the second group, the two or more groups include a third group, one or more of the guide holes that belong to the third group being configured such that one or more nails or pins is/are inserted through the one or more of the guide holes and such that the one or more nails or pins is/are guided by the one or more of the guide holes in a third direction which is different from the first direction and the second direction;

one or more of the guide holes that belong to the third group is/are located along the outer surface of the side wall at a central portion of the side wall or in a vicinity thereof;

the one or more engaging portions is/are configured to be engaged with the wall surface by nails or pins which are respectively inserted through the guide holes that belong to the first group, the second group, and the third group and pushed into the wall surface in a state where the one or more engaging portions is/are contacted with the wall surface;

when fixing the article attaching member at the desired position on the wall surface, the one or more engaging portions is/are engaged with the wall surface by one or more nails or pins which is/are inserted through the one or more of the guide holes that belong to the first group and pushed into the wall surface in the first direction, one or more nails or pins which is/are inserted through the one or more of the guide holes that belong to the second group and pushed into the wall surface in the second direction, and one or more nails or pins which is/are inserted through the one or more of the guide holes that belong to the third group and pushed into the wall surface in the third direction; and the engaged portion of the article attaching member received in the space and the engagement wall are connected together by the connecting means, thereby fixing the article attaching member at the desired position.

9. The fixing device according to claim 8, wherein as the one or more engaging portions, a third engaging portion formed at the central portion of the side wall or in the vicinity thereof is further included;

one or more of the guide holes that belong to the third group is/are disposed in the third engaging portion, and a slope which is approximately perpendicular to the third direction is formed on a surface of the third engaging portion.

10. The fixing device according to claim 9, wherein as the one or more engaging portions, a first engaging portion formed at one end of the side wall or in a vicinity thereof, and a second engaging portion formed at the other end of the side wall or in a vicinity thereof are included;

the one or more of the guide holes that belong to the first group is/are disposed in the first engaging portion, and a slope which is approximately perpendicular to the first direction is formed on a surface of the first engaging portion;

the one or more of the guide holes that belong to the second group is/are disposed in the second engaging portion, and a slope which is approximately perpendicular to the second direction is formed on a surface of the second engaging portion;

the one or more of the guide holes of the first engaging portion is/are configured to be inclined toward an inner side of the side wall and to be inclined toward a center of the side wall along the outer surface of the side wall, and the one or more of the guide holes of the first engaging portion is/are configured such that one or more tips of one or more nails or pins that is/are entirely inserted through the one or more of the guide holes of the first engaging portion is/are located in the inside of the side wall;

the one or more of the guide holes of the second engaging portion is/are configured to be inclined toward the inner side of the side wall and to be inclined toward the center of the side wall along the outer surface of the side wall, and the one or more of the guide holes of the second engaging portion is/are configured such that one or more tips of one or more nails or pins that is/are entirely inserted through the one or more of the guide holes of the second engaging portion is/are located in the inside of the side wall; and the one or more guide holes of the third engaging portion is/are configured to be inclined toward the inner side of the side wall and to be inclined in a direction perpendicular to the connecting portion along the outer surface of the side wall, and the one or more of the guide holes of the third engaging portion is/are configured such that one or more tips of one or more nails or pins that is/are entirely inserted through the one or more of the guide holes of the third engaging portion is/are located in the inside of the side wall.

11. A fixing structure for an article attaching member, comprising:

the fixing device for an article attaching member according to claim 1;

wherein in the fixing device, the one or more engaging portions, which is/are in contact with the wall surface, is/are engaged with the wall surface by nails or pins which are inserted through the one or more of the guide holes that belong to the first group and pushed into the wall surface in the first direction, and nails or pins which are inserted through the one or more of the guide holes that belong to the second group and pushed into the wall surface in the second direction; and the engaged portion of the article attaching member received in the space and the engagement wall are connected together by the connecting means, whereby the article attaching member is fixed at the desired position.

12. The fixing structure according to claim 11, wherein the article attaching member is a plate-like member made of wood, iron, or synthetic resin.

* * * * *